US007877338B2

(12) United States Patent
Tani et al.

(10) Patent No.: US 7,877,338 B2
(45) Date of Patent: Jan. 25, 2011

(54) INFORMATION PROCESSING APPARATUS, METHOD, AND PROGRAM USING RECURRENT NEURAL NETWORKS

(75) Inventors: Jun Tani, Saitama (JP); Ryunosuke Nishimoto, Saitama (JP); Masato Ito, Tokyo (JP)

(73) Assignees: Sony Corporation, Tokyo (JP); Riken, Saitama (JP)

( * ) Notice: Subject to any disclaimer, the term of this patent is extended or adjusted under 35 U.S.C. 154(b) by 925 days.

(21) Appl. No.: 11/803,237

(22) Filed: May 14, 2007

(65) Prior Publication Data

US 2007/0265841 A1 Nov. 15, 2007

(30) Foreign Application Priority Data

May 15, 2006 (JP) ............................... 2006-135714

(51) Int. Cl.
*G06E 1/00* (2006.01)
*G06E 3/00* (2006.01)
(52) U.S. Cl. ................................. 706/15; 700/31; 703/9
(58) Field of Classification Search .................... 706/15; 700/31; 703/9
See application file for complete search history.

(56) References Cited

U.S. PATENT DOCUMENTS 5,930,754 A * 7/1999 Karaali et al. ................ 704/259
2001/0013008 A1* 8/2001 Waclawski .................... 705/10
2006/0025931 A1* 2/2006 Rosen et al. ................... 702/19

FOREIGN PATENT DOCUMENTS

| JP | 11 126198 | 5/1999 |
| JP | 2000 35804 | 2/2000 |
| JP | 2005 135287 | 5/2005 |

OTHER PUBLICATIONS

Syuji Kaneko et al., "Representing the bifurcation structure of BVP neuron model onto a self-organising map by using modular network SOM (mnSOM)"; Institute of Electronics, Information and Communication Engineers technical study reports vol. 104, Japan, Corporate judicial person Institute of Electronics, Information and Communication Engineers, Nov. 19, 2004 p. 29.

* cited by examiner

*Primary Examiner*—Michael B. Holmes
*Assistant Examiner*—Kalpana Bharadwaj
(74) *Attorney, Agent, or Firm*—Frommer Lawrence & Haug LLP; William S. Frommer; Thomas F. Presson

(57) ABSTRACT

An information processing apparatus, includes a lower time series data generation unit having a plurality of recurrent neural networks which learn predetermined time series data, and generating prediction time series data. An upper time series data generation unit has recurrent neural networks which learn error time series data that is time series data of errors raised at the time of the learning by the respective plural recurrent neural networks of the lower time series data generation unit. Generation of prediction error time series data that is time series data of prediction errors; and a conversion unit that performs nonlinear conversion for the prediction errors generated by the upper time series data generation unit. The lower time series data generation unit outputs the prediction time series data according to the prediction errors.

9 Claims, 20 Drawing Sheets

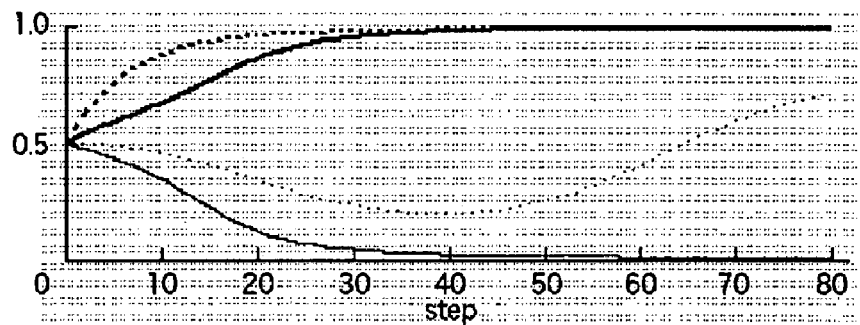
FIG.16A
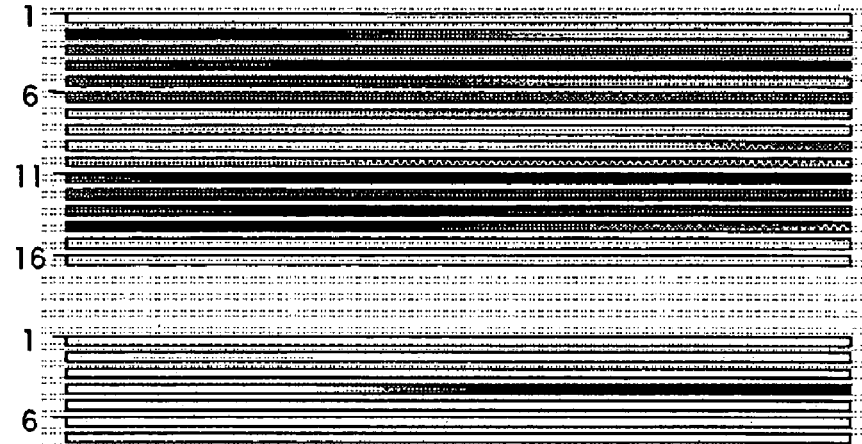
FIG.16B
FIG.16C
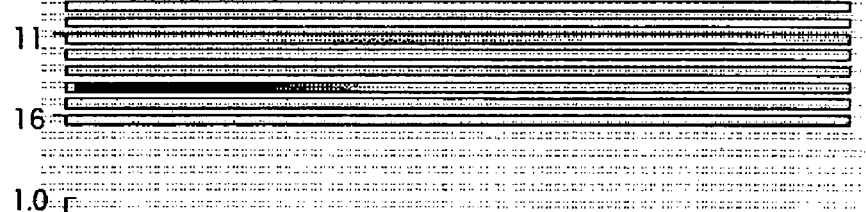
FIG.16D
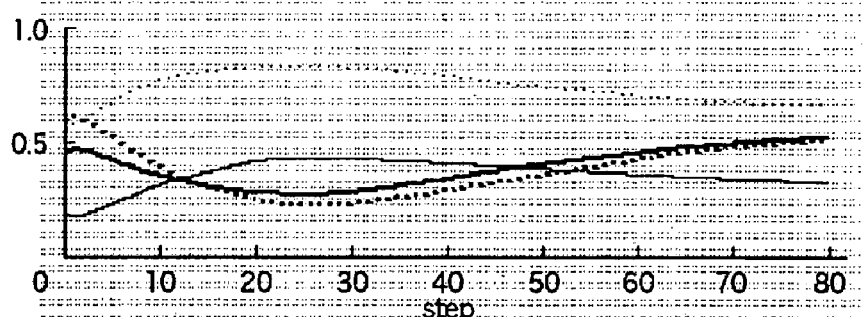
FIG.16E
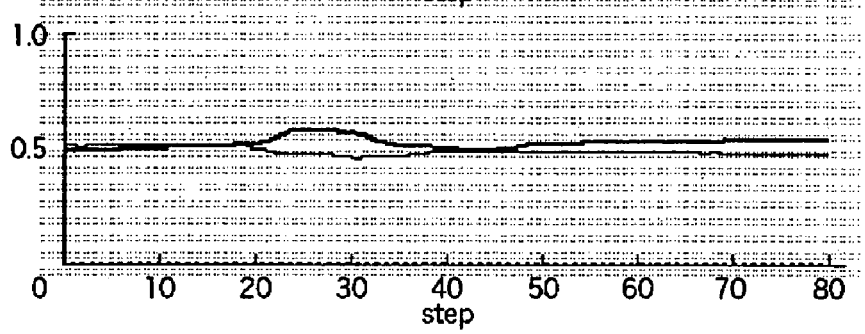

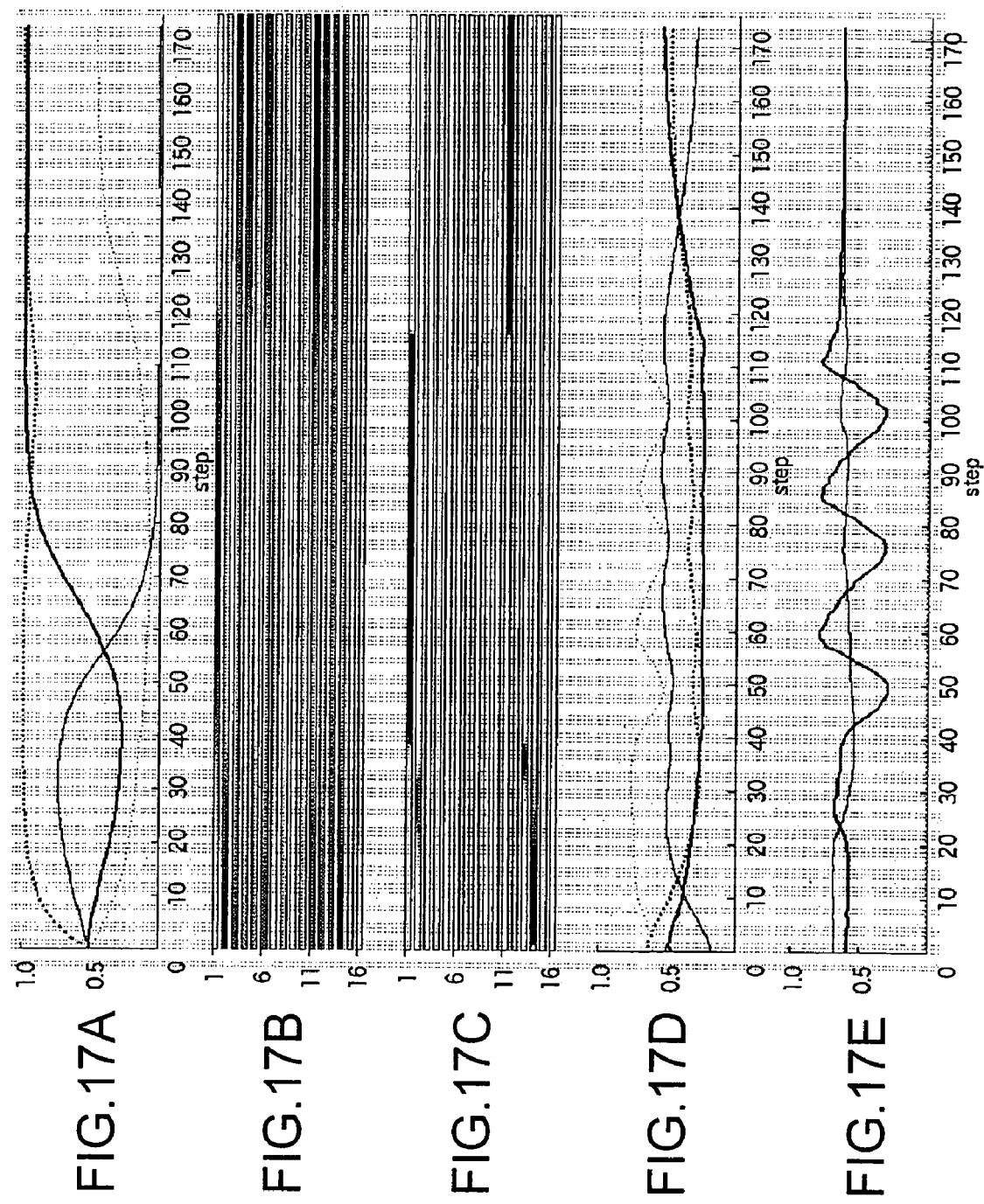

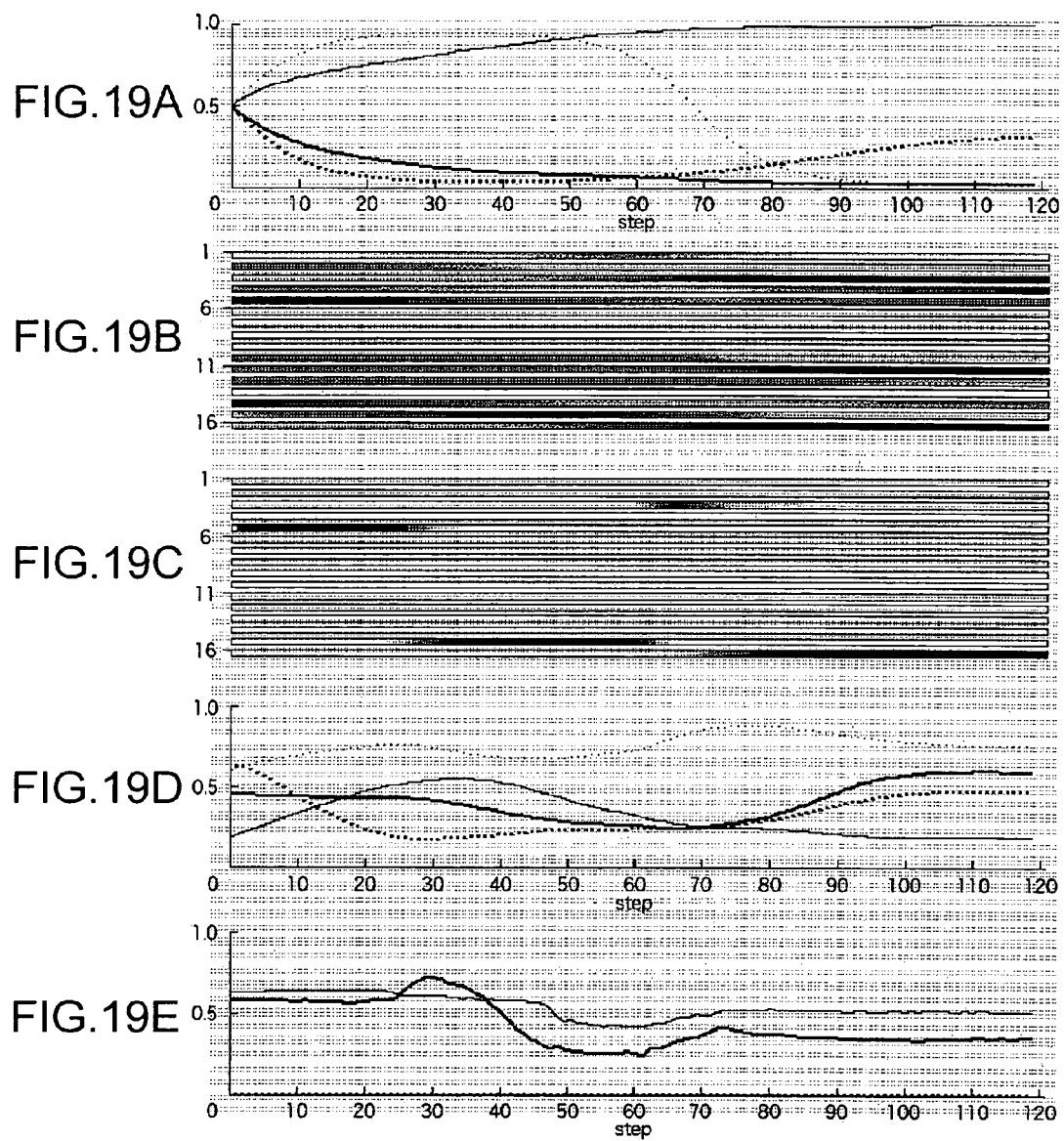

INFORMATION PROCESSING APPARATUS, METHOD, AND PROGRAM USING RECURRENT NEURAL NETWORKS

CROSS REFERENCES TO RELATED APPLICATIONS

The present invention contains subject matter related to Japanese Patent Application JP 2006-135714 filed in the Japanese Patent Office on May 15, 2006, the entire contents of which being incorporated herein by reference.

BACKGROUND OF THE INVENTION

1. Field of the Invention

The present invention relates to an information processing apparatus, an information processing method, and a program, and more particularly, to an information processing apparatus, an information processing method, and a program which can generate time series data more correctly.

2. Description of the Related Art

The present applicant has suggested an invention of generating time series data according to the result of learning using recurrent neural networks (for example, refer to Jpn. Pat. Appln. Laid-Open Publication No. 11-126198).

According to this suggestion, as shown in FIG. 1, an information processing apparatus basically includes a network of lower hierarchy having recurrent neural networks (referred to as RNNs, hereinafter) 1-1 to 1-v, and a network of upper hierarchy having RNNs 11-1 to 11-v.

In the lower hierarchy network, outputs from the RNNs 1-1 to 1-v are supplied to a composition circuit 3 through corresponding gates 2-1 to 2-v to be composited.

Similarly, in the upper hierarchy network, outputs from the RNNs 11-1 to 11-v are supplied to a composition circuit 13 through corresponding gates 12-1 to 12-v to be composited. Then, based on the output from the composition circuit 13 of the upper hierarchy network, the on/off of the lower hierarchy gates 2-1 to 2-v is controlled.

In the information processing apparatus shown in FIG. 1, the lower hierarchy RNNs 1-1 to 1-v are made to generate time series data P1 to Pv respectively, and a predetermined gate of the lower hierarchy gates 2-1 to 2-v is set on or set off based on the output from the upper hierarchy composition circuit 13. Thus, one of the time series data P1 to Pv, which is output from a predetermined one of the RNNs 1-1 to 1-v, can be selectively output from the composition circuit 3.

Accordingly, for example, as shown in FIG. 2, time series data can be generated such that the time series data P1 is generated for a predetermined time period, and the time series data P2 is generated for a next predetermined time period, and then the time series data P1 is generated for a next predetermined time period again.

SUMMARY OF THE INVENTION

In above-described suggestion, since the Winner-take-all operation is executed, in which any one of the gates 2-1 to 2-v is set on, there is raised no problem in case the winner of the gates 2-1 to 2-v is clearly discriminated. However, for example, in case the levels determining the winner are antagonistic to each other among plural gates, the winner of the gates 2-1 to 2-v may be frequently changed, which makes it difficult to correctly generate time series data.

It is therefore desirable to overcome the above-mentioned drawbacks by providing an information processing apparatus, an information processing method, and a program which can generate time series data more correctly.

According to an embodiment of the present invention, there is provided an information processing apparatus, including: a lower time series data generation means having a plurality of recurrent neural networks which learn predetermined time series data, and generate prediction time series data according to the learning result; an upper time series data generation means having recurrent neural networks which learn error time series data that is time series data of errors raised at the time of the learning by the respective plural recurrent neural networks of the lower time series data generation means, and generate prediction error time series data that is time series data of prediction errors according to the learning result; and a conversion means for performing nonlinear conversion for the prediction errors generated by the upper time series data generation means; wherein the lower time series data generation means outputs the prediction time series data generated by the respective plural recurrent neural networks according to the prediction errors which have undergone the nonlinear conversion by the conversion means.

According to the information processing apparatus, the lower time series data generation means may further include a plurality of gate means for opening and closing the outputs of the prediction time series data at the subsequent stages of the respective plural recurrent neural networks, and the plural gate means open and close the outputs of the prediction time series data according to the prediction errors which have undergone the nonlinear conversion by the conversion means.

According to the information processing apparatus, the lower time series data generation means may further include a composition means for compositing and outputting the prediction time series data output from the plural gate means.

According to the information processing apparatus, the recurrent neural networks of the upper time series data generation means may be recurrent neural networks of the continuous time type.

According to the information processing apparatus, the conversion means may perform the nonlinear conversion for the prediction errors generated by the upper time series data generation means using the softmax function.

The information processing apparatus may further include a temporal filter means for performing the temporal filter processing for the errors output by the lower time series data generation means.

The information processing apparatus may further include a nonlinear filter means for nonlinearly converting the errors output by the lower time series data generation means.

According to the information processing apparatus, at the time of the learning, the lower time series data generation means may update the weight of learning of the respective plural recurrent neural networks according to errors raised at the time of the learning by the respective plural recurrent neural networks.

According to the information processing apparatus, at the time of the learning, of errors raised at the time of the learning by the respective plural recurrent neural networks, the lower time series data generation means may set a recurrent neural network that has raised a minimum error to the winner, and update the weight of learning of the respective plural recurrent neural networks according to the distance from the winner.

According to an embodiment of the present invention, there is also provided an information processing method, including the steps of: learning predetermined time series data, and generating prediction time series data according to the learning result; learning error time series data that is time series data of errors raised at the time of learning the predetermined time series data, and generating prediction error time series data that is time series data of prediction errors according to the learning result; performing nonlinear conversion for the generated prediction errors; and outputting the generated prediction time series data according to the prediction errors which have undergone the nonlinear conversion.

According to an embodiment of the present invention, there is also provided a program that makes a computer execute a processing, the processing including the steps of: learning predetermined time series data, and generating prediction time series data according to the learning result; learning error time series data that is time series data of errors raised at the time of learning the predetermined time series data, and generating prediction error time series data that is time series data of prediction errors according to the learning result; performing nonlinear conversion for the generated prediction errors; and outputting the generated prediction time series data according to the prediction errors which have undergone the nonlinear conversion.

According to one aspect of the present invention, the prediction time series data is generated according to the result of learning the predetermined time series data. Furthermore, the prediction error time series data that is time series data of prediction errors is generated according to the result of learning the error time series data that is time series data of errors raised at the time of learning the predetermined time series data. Moreover, the nonlinear conversion is performed for the generated prediction errors, and the generated prediction time series data is output according to the prediction errors which have undergone the nonlinear conversion.

According to one aspect of the present invention, it becomes possible to generate time series data more correctly.

The nature, principle and utility of the invention will become more apparent from the following detailed description when read in conjunction with the accompanying drawings in which like parts are designate by like reference numerals or characters.

BRIEF DESCRIPTION OF THE DRAWINGS

In the accompanying drawings:

FIGS. 16A to 16E show experiment results of the information processing apparatus 51;

FIGS. 17A to 17E show experiment results of the information processing apparatus 51;

FIGS. 19A to 19E show experiment results of the information processing apparatus 51.

DETAILED DESCRIPTION OF THE PREFERRED EMBODIMENTS

Preferred embodiments of the present invention will be explained hereinafter. The correspondence relationship between constituent features of the present invention and embodiments written in the specification and drawings is represented as follows. This description is intended to confirm that the embodiments supporting the present invention are written in the specification and drawings. Accordingly, even if there are embodiments which are written in the specification and drawings, and are not written here as embodiments corresponding to the constituent features of the present invention, this does not mean that the embodiments do not correspond to the constituent features. Conversely, even if embodiments are written here as those corresponding to the constituent features, this does not mean that the embodiments do not correspond to constituent features other than the constituent features.

Figure 1:
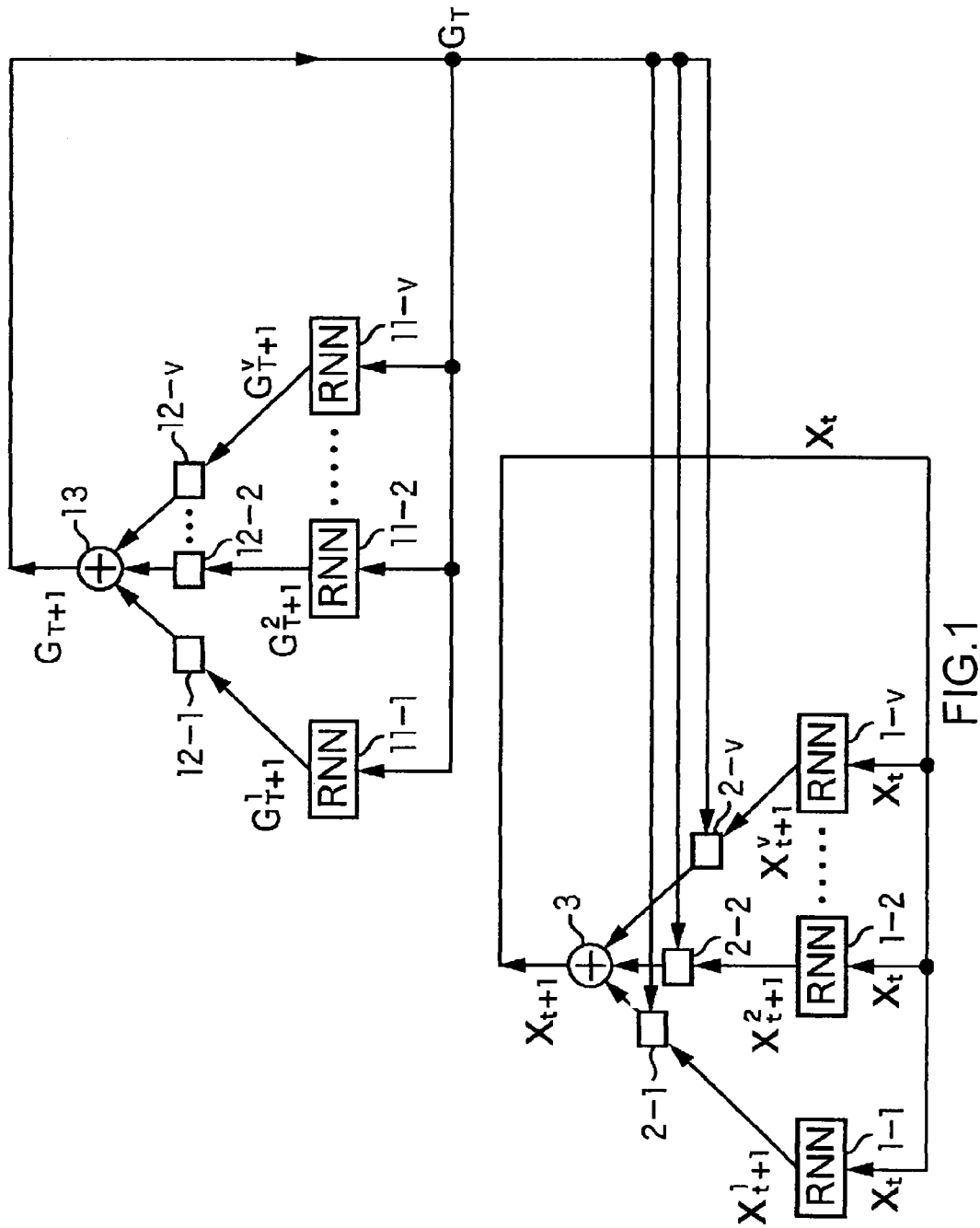
FIG. 1 shows a schematic view indicative of an example of a conventional information processing apparatus.
Figure 2:
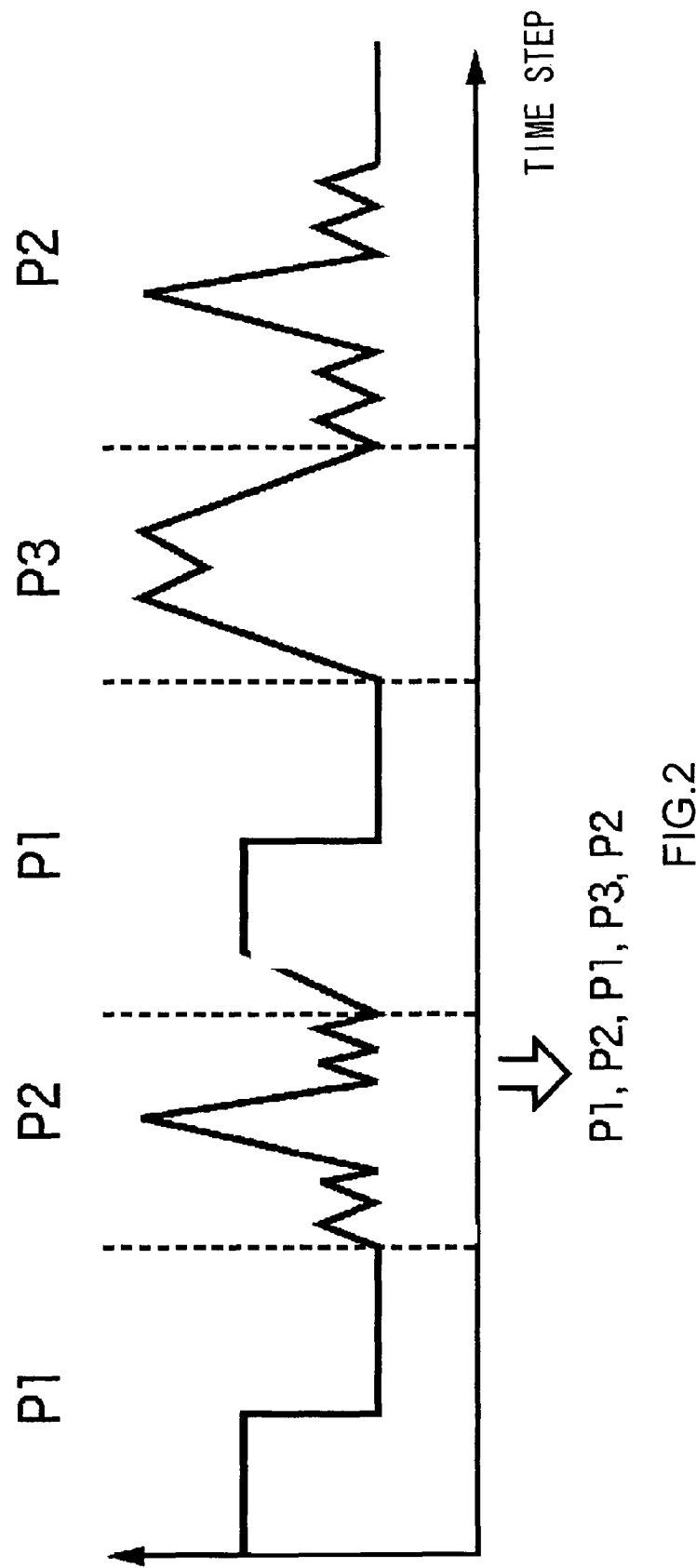
FIG. 2 shows a view indicative of an example of time series data generated by the information processing apparatus shown in FIG. 1.
Figure 3:
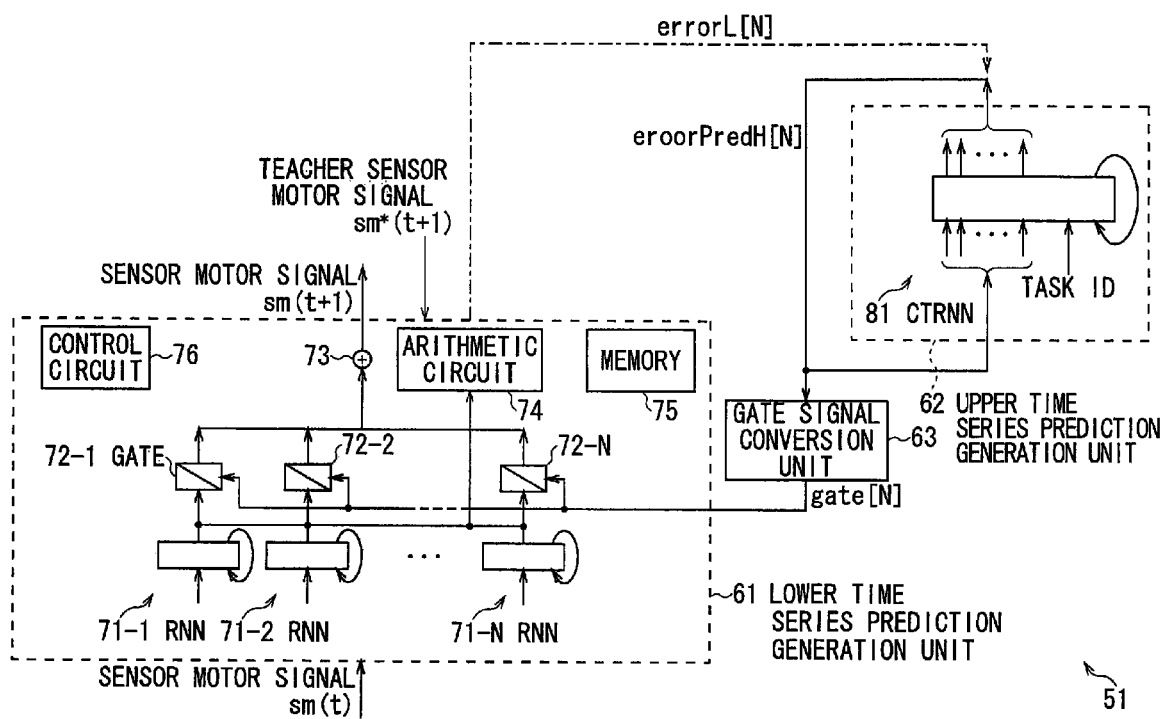
FIG. 3 shows a block diagram indicative of an example of the configuration of the information processing apparatus according to an embodiment of the present invention.

According to one aspect of the present invention, there is provided an information processing apparatus (for example, information processing apparatus 51 shown in FIG. 3), which includes a lower time series data generation unit (for example, lower time series prediction generation unit 61 shown in FIG. 3) having a plurality of recurrent neural networks which learn predetermined time series data, and generate prediction time series data according to the learning result, an upper time series data generation unit (for example, upper time series prediction generation unit 62 shown in FIG. 3) having recurrent neural networks which learn error time series-data that is time series data of errors raised at the time of the learning by the respective plural recurrent neural networks of the lower time series data generation unit, and generate prediction error time series data that is time series data of prediction errors according to the learning result, and a conversion unit (for example, gate signal conversion unit 63 shown in FIG. 3) for performing nonlinear conversion for the prediction errors generated by the upper time series data generation unit, in which the lower time series data generation unit outputs the prediction time series data generated by the respective plural recurrent neural networks according to the prediction errors which have undergone the nonlinear conversion by the conversion unit.

According to the aspect of the information processing apparatus, the lower time series data generation unit further includes a plurality of gate units (for example, gates 72-1 to 72-N shown in FIG. 3) for opening and closing the outputs of the prediction time series data at the subsequent stages of the respective plural recurrent neural networks, and the plural gate units open and close the outputs of the prediction time series data according to the prediction errors which have undergone the nonlinear conversion by the conversion unit.

According to the aspect of the information processing apparatus, the lower time series data generation unit further includes a composition unit (for example, composition circuit 73 shown in FIG. 3) for compositing and outputting the prediction time series data output from the plural gate unit.

According to the aspect, the information processing apparatus further includes a temporal filter unit (for example, temporal filter unit 201 shown in FIG. 12) for performing the temporal filter processing for the errors output by the lower time series data generation unit.

According to the aspect, the information processing apparatus further includes a nonlinear filter unit (for example, nonlinear filter unit 202 shown in FIG. 12) for nonlinearly converting the errors output by the lower time series data generation unit.

Figure 7:
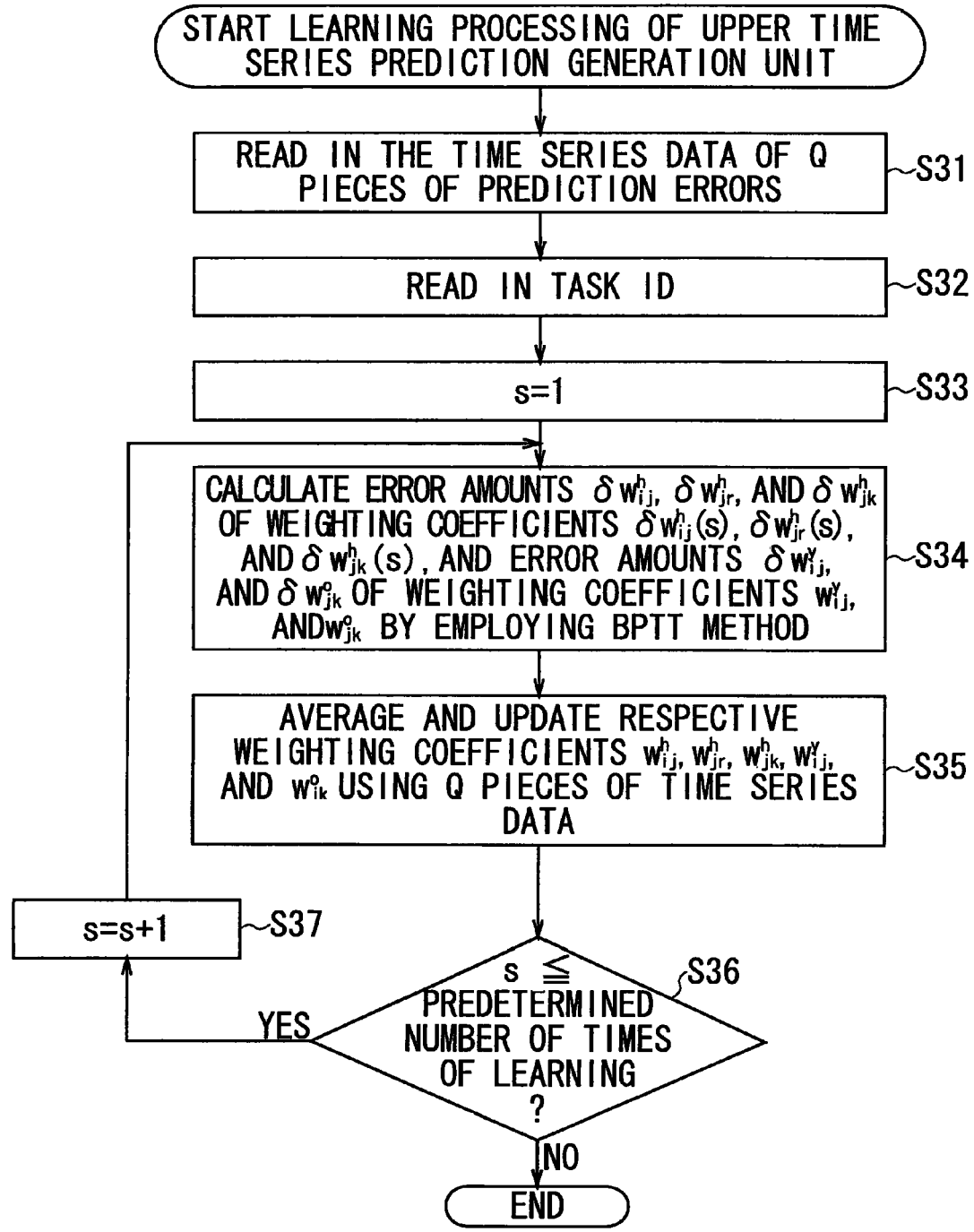
FIG. 7 shows a flowchart for explaining the learning processing of the upper time series prediction generation unit.
Figure 8:
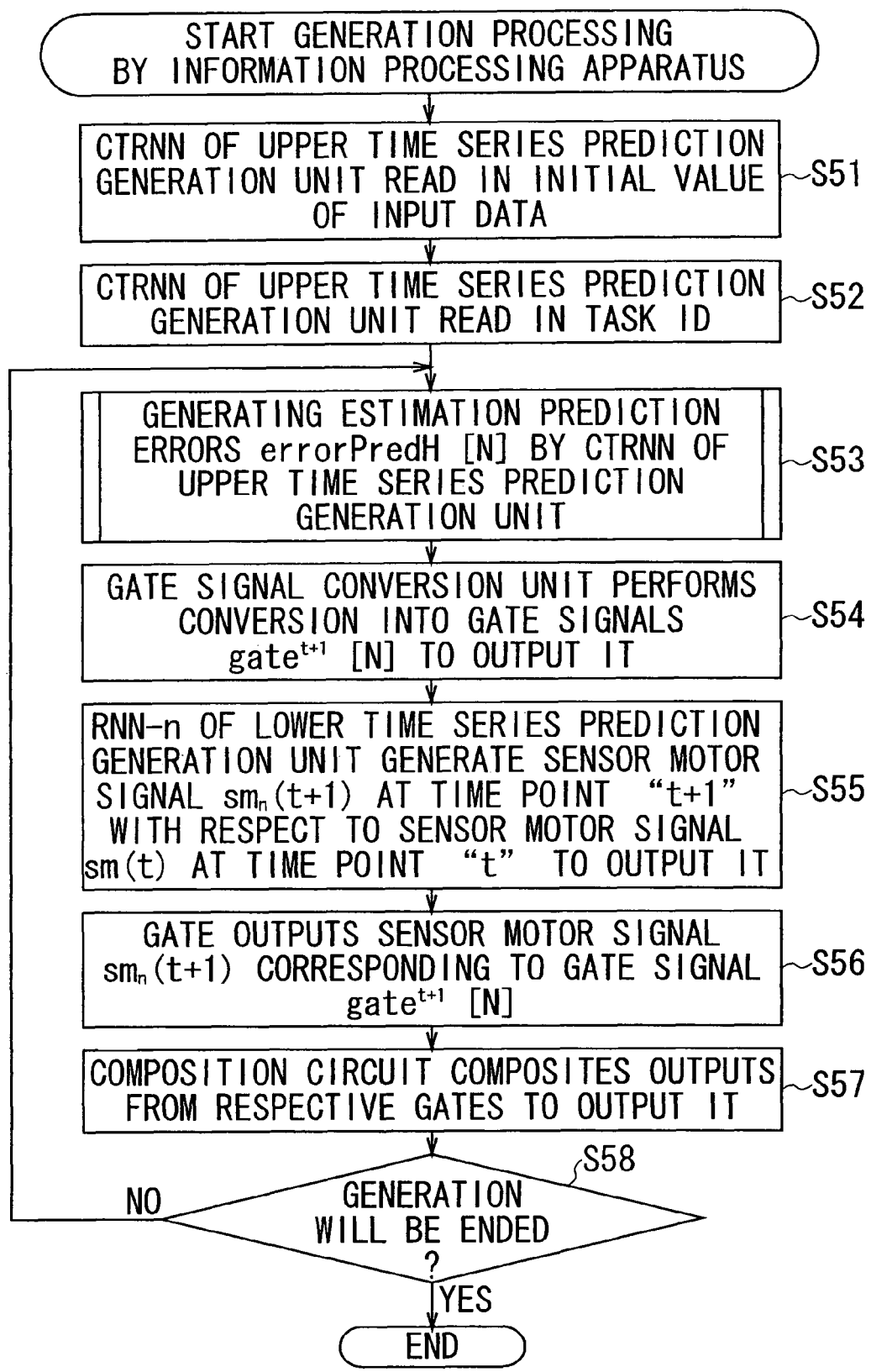
FIG. 8 shows a flowchart for explaining the generation processing of the information processing apparatus shown in FIG. 3.

According to one aspect of the present invention, there is also provided an information processing method and program, which include the steps of learning predetermined time series data, and generating prediction time series data according to the learning result (for example, step S1 to step S7 shown in FIG. 6 and step S55 shown in FIG. 8), learning error time series data that is time series data of errors raised at the time of learning the predetermined time series data, and generating prediction error time series data that is time series data of prediction errors according to the learning result (for example, step S31 to step S37 shown in FIG. 7 and step S53 shown in FIG. 8), performing nonlinear conversion for the generated prediction errors (for example, step S54 shown in FIG. 8), and outputting the generated prediction time series data according to the prediction errors which have undergone the nonlinear conversion (for example, step S57 shown in FIG. 8).

The preferred embodiments of the present invention will further be described below with reference to the accompanying drawings.

FIG. 3 shows a block diagram indicative of an example of the configuration of an information processing apparatus 51 according to an embodiment of the present invention.

The information processing apparatus 51 shown in FIG. 3 may be built in a robot. The robot having built therein the information processing apparatus 51 is provided with at least a sensor for sensing a subject which is to be visually recognized, and a motor which is driven so as to move the robot, both of which are not shown, and a sensor motor signal which is a signal from the sensor and motor is supplied to the information processing apparatus 51.

The information processing apparatus 51 includes a lower time series prediction generation unit 61, an upper time series prediction generation unit 62, and a gate signal conversion unit 63, and executes learning processing of learning time series data given as teacher data and generation processing of generating (reproducing) time series data with respect to input according to the learning result.

In this embodiment, an example of learning and generating action sequences, which are series of performances carried out by a humanoid robot, by the information processing apparatus 51 will be explained.

In the following example, the information processing apparatus 51 learns three action sequences A, B, and C.

The performance of the humanoid robot as the action sequence A is such that the robot in the initial state which spreads out its both arms from side to side visually recognizes a cubic object placed on a table in front, and carries out the performance of seizing and holding up the object using its both hands up to a predetermined height and placing the object on the table again by plural times, and then returns its both arms to a position of the initial state (referred to as home position, hereinafter).

The performance of the humanoid robot as the action sequence B is such that the robot in the initial state visually recognizes a cubic object placed on a table in front, and carries out the performance of touching the object using its right hand and returning its arms to the home position, and then touching the object using its left hand and returning its arms to the home position, that is, touching the object using its one hand alternately, by plural times.

The performance of the humanoid robot as the action sequence C is such that the robot in the initial state visually recognizes a cubic object placed on a table in front, and carries out the performance of touching the object using its both hands once, and then returning its arms to the home position.

The information processing apparatus 51 learns and generates a signal for the sensor (for example, visual sensor) and motor in executing the action sequences A to C.

The lower time series prediction generation unit 61 includes N pieces of recurrent neural networks (referred to as RNNs, hereinafter) 71-1 to 71-N, gates 72-1 to 72-N which are arranged at the subsequent stages of the RNNs 71-1 to 71-N, a composition circuit 73, an arithmetic circuit 74, a memory 75, and a control circuit 76. In case the RNNs 71-1 to 71-N do not have to be discriminated, the RNNs 71-1 to 71-N are simply referred to as RNN 71. Similarly, the gates 72-1 to 72-N may be simply referred to as gate 72.

To the lower time series prediction generation unit 61, a sensor motor signal from the sensor and motor arranged in the humanoid robot is input. Hereinafter, a sensor motor signal which is input to the lower time series prediction generation unit 61 at the time point "t" is represented as sm (t).

The lower time series prediction generation unit 61 predicts a sensor motor signal sm (t+1) at the time point "t+1" with respect to the sensor motor signal sm (t) at the time point "t" input thereto, according to the learning result, and outputs thus predicted sensor motor signal sm (t+1).

Specifically, the RNN 71-n (n=1, 2, . . . , N) generates the sensor motor signal sm (t+1) at the time point "t+1" with respect to the input sensor motor signal sm (t) at the time point "t", according to the learning result, and outputs thus generated sensor motor signal sm (t+1) to the gate 72-n.

On the other hand, the action sequence is considered to be configured by a gathering (sequence) of various plural action parts (motion primitives). For example, it can be considered that the action sequence A is a gathering of action parts or visually recognizing an object, making its both hands come close to the object (until seizing the object), holding up the object, getting down thus held up object, and returning its both arms to the home position. Each of the RNNs 71-1 to 71-N exclusively learns time series data of a sensor motor signal corresponding to a single action part.

Accordingly, since action parts learned by the RNNs 71-1 to 71-N are different from each other, even if the same sensor motor signal sm (t) is input to the respective RNNs 71-1 to 71-N, the sensor motor signal sm (t+1) output from the respective RNNs 71-1 to 71-N is different. The sensor motor signal sm (t+1) output from the RNN 71-n is represented as sensor motor signal $sm_n$ (t+1).

To the gate 72-n which is arranged at the subsequent stage of the RNN 71-n, in addition to the sensor motor signal $sm_n$ (t+1) at the time point. "t+1" from the RNN 71-n, gate signals gate N={$g_1, g_2, \ldots, g_N$} which are control signals for controlling the opened/closed state of the gates 72-1 to 72-N are supplied from the gate signal conversion unit 63. As will be explained later, the sum of the gate signal $g_n$ configuring the gate signals gate N is 1 ($\Sigma g_n = 1$).

The gate 72-n opens or closes the output of the sensor motor signal $sm_n$ (t+1) from the RNN 71-n according to the gate signal $g_n$. That is, the gate 72-n outputs $g_n \times sm_n$ (t+1) to the composition circuit 73 at the time point "t+1".

The composition circuit 73 composites outputs from the respective gates 72-1 to 72-N, and outputs thus composited signal as the sensor motor signal sm (t+1) at the time point "t+1". That is, the composition circuit 73 outputs the sensor motor signal sm (t+1) which is represented by the following mathematical formula (1).

[Mathematical formula 1]

$$sm(t+1) = \sum_{n=1}^{N} g_n \times sm_n(t+1) \qquad (1)$$

When learning time series data of the sensor motor signal, the arithmetic circuit 74 calculates prediction errors errorL$^{t+1}$ N={errorL$^{t+1}_1$, errorL$^{t+1}_2$, ..., errorL$^{t+1}_N$} between the sensor motor signals $sm_1$ (t+1) to $sm_N$ (t+1) at the time point "t+1" which are output from the respective RNNs 71-1 to 71-N with respect to the sensor motor signal sm (t) at the time point "It" and a teacher sensor motor signal sm* (t+1) at the time point "t+1" which is given to the lower time series prediction generation unit 61 as teacher data. As will be represented by a mathematical formula (16) to be described later, the prediction errors errorL$^{t+1}$ N are calculated as errors by taking not only the errors at the time point "t+1" but also the errors for the past L steps from the time point "t+1" into consideration.

The prediction error errorL$^{t+1}_n$ of the RNN 71-n at the time point "t+1" calculated by the arithmetic circuit 74 is supplied to the memory 75 to be stored therein.

Since the prediction errors errorL$^{t+1}$ N are repeatedly calculated in the time-series manner in the arithmetic circuit 74, and thus calculated prediction errors errorL$^{t+1}$ N are stored in the memory 75, time series data errorL N of the prediction errors for the teacher data is stored in the memory 75. The time series data errorL N of the prediction errors is supplied to the upper time series prediction generation unit 62. The arithmetic circuit 74 normalizes the time series data errorL N of the prediction errors for the teacher data to a value in the range from "0" to "1", and outputs thus normalized value.

As described above, the memory 75 stores the time series data errorL N of the prediction errors for the teacher data. Furthermore, the memory 75 stores use frequencies FREQ$_1$ to FREQ$_N$ of the RNNs 71-1 to 71-N. The use frequencies FREQ$_1$ to FREQ$_N$ of the RNNs 71-1 to 71-N will be explained later with reference to FIG. 6.

The control circuit 76 controls the respective units of the lower time series prediction generation unit 61, or the RNNs 71-1 to 71-N, arithmetic circuit 74, memory 75, etc.

On the other hand, the upper time series prediction generation unit 62 is configured by a single continuous time RNN (referred to as CTRNN, hereinafter) 81.

The CTRNN 81 of the upper time series prediction generation unit 62 estimates (predicts) how much prediction errors the RNNs 71-1 to 71-N of the lower time series prediction generation unit 61 generate at the time of generation, and outputs thus obtained estimation prediction errors.

That is, the CTRNN 81 uses and learns the time series data errorL N of the prediction errors of the RNNs 71-1 to 71-N as the teacher data, and generates and outputs estimation prediction errors errorPredH N={errorPredH$_1$, errorPredH$_2$, ..., errorPredH$_N$} of the RNNs 71-1 to 71-N based on the learning result. The estimation prediction errors errorPredH N at the time point "t" are set such that errorPredH$^t$ N={errorPredH$^t_1$, errorPredH$^t_2$, ..., errorPredH$^t_N$}.

Furthermore, to the CTRNN 81, a task ID as a task switch signal for switching which one of the estimation prediction errors errorPredH N of the action sequences A and B is output is given.

The gate signal conversion unit 63 converts the estimation prediction errors errorPredH$^t$ N at the time point "t" to gate signals gate$^t$ N={$g^t_1, g^t_2, \ldots, g^t_N$} using the softmax function, and outputs thus converted signals to the gates 72-1 to 72-N.

The gate signal $g^t_n$ for the gate 72-n at the time point "t" is represented by the following mathematical formula (2).

[Mathematical formula 2]

$$g^t_n = softmax(errorPredH^t_n) \qquad (2)$$
$$= \frac{\exp(errorPredH^t_n)}{\sum_{p=1}^{N} \exp(errorPredH^t_n)}$$

According to the mathematical formula (2), the nonlinear conversion is performed such that a prediction error of small value comes to be of large value, while a prediction error of large value comes to be of small value. As a result, a control under which the gate is opened larger in case the prediction error is of smaller value, while the gate is opened smaller in case the prediction error is of larger value is carried out at the gates 72-1 to 72-N of the lower time series prediction generation unit 61.

In thus configured information processing apparatus 51, the upper time series prediction generation unit 62 outputs the estimation prediction errors errorPredH N which are estimation values of prediction errors generated by the RNNs 71-1 to 71-N of the lower time series prediction generation unit 61 at the time of generation, and the estimation prediction errors errorPredH N are converted to the gate signals gate N for controlling the opened/closed state of the gates 72-1 to 72-N. Then, the sum of the output signals $sm_1$ (t+1) to $sm_N$ (t+1) of the RNNs 71-1 to 71-N output from the gates 72-1 to 72-N which have their opened/closed state controlled, which is represented by above-described mathematical formula (1), is supplied to the sensor and motor arranged in the humanoid robot as the sensor motor signal sm (t+1) at the time point "t+1".

Since the estimation prediction errors errorPredH N as the outputs of the upper time series prediction generation unit 62 are converted to the gate signals gate N in the gate signal conversion unit 63 arranged at the subsequent stage, it can be said that the upper time series prediction generation unit 62 predicts which gate among the gates 72-1 to 72-N is opened (large) at the time point "t".

Figure 4:
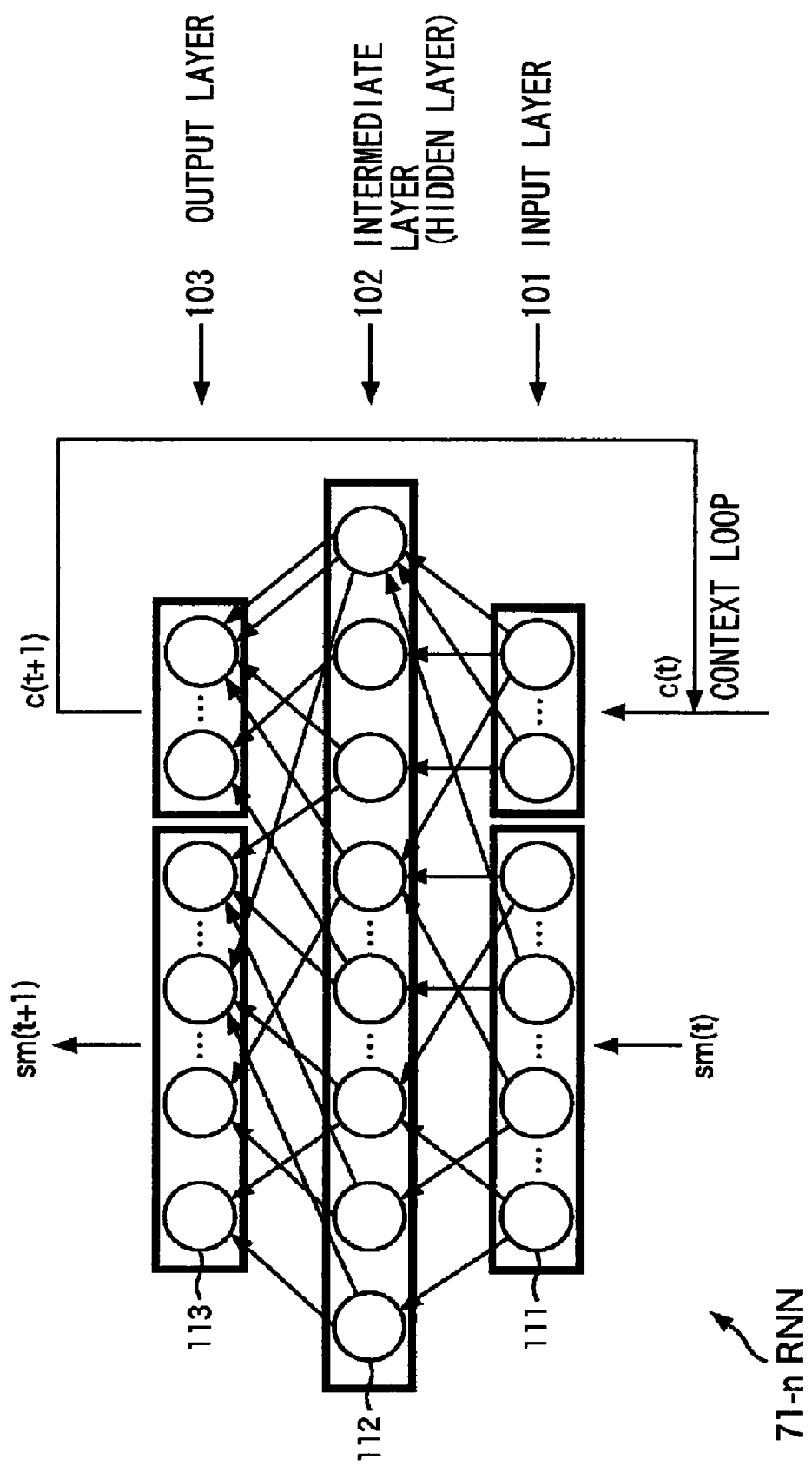
FIG. 4 shows a schematic view indicative of an example of the detailed configuration of RNNs to be used in a lower time series prediction generation unit.

FIG. 4 shows a schematic view indicative of an example of the detailed configuration of the RNN 71-n.

As shown in FIG. 4, the RNN 71-n includes an input layer 101, an intermediate layer (hidden layer) 102, and an output layer 103. The input layer 101 has nodes 111 of a predetermined number, the intermediate layer (hidden layer) 102 has nodes 112 of a predetermined number, and the output layer 103 has nodes 113 of a predetermined number.

To the nodes 111 of the input layer 101, the sensor motor signal sm (t) at the time point "t", and data that is output from some of the nodes 113 of the output layer 103 at the time point "t−1" which is the previous time point from the time point "t" by one to be fed back as a context c (t) indicative of the internal state of the RNN 71-n are input.

The nodes 112 of the intermediate layer 102 perform the weighting addition processing of summing up data input from the nodes 111 of the input layer 101 and weighting coefficients between the nodes 112 and nodes 111 which have been obtained by the learning in advance, and output thus obtained summed up data to the nodes 113 of the output layer 103.

The nodes 113 of the output layer 103 perform the weighting addition processing of summing up data input from the nodes 112 of the intermediate layer 102 and weighting coefficients between the nodes 113 and nodes 112 which have been obtained by the learning in advance. Some of the nodes 113 configuring the output layer 103 output thus obtained summed up data as the sensor motor signal $sm_n$ (t+1) at the time point "t+1". Furthermore, other nodes 113 configuring the output layer 103 feed back the summed up data to the nodes 111 of the input layer 101 as a context c (t+1) at the time point "t+1".

As described above, by carrying out the weighting addition processing using weighting coefficients between nodes which have been obtained by the learning in advance, the RNN 71-n predicts and outputs the sensor motor signal $sm_n$ (t+1) at the time point "t+1" with respect to the input sensor motor signal sm (t) at the time point "t".

In the learning of obtaining weighting coefficients between nodes, the BPTT (Back Propagation Through Time) method is employed. The BPTT method is a learning algorithm for RNNs having a context loop to which the BP (Back Propagation) method in the general hierarchical type neural networks is applied by spatially expanding the state of temporal signal propagation. This method is similarly employed in obtaining weighting coefficients in the CTRNN 81 to be described subsequently.

Figure 5:
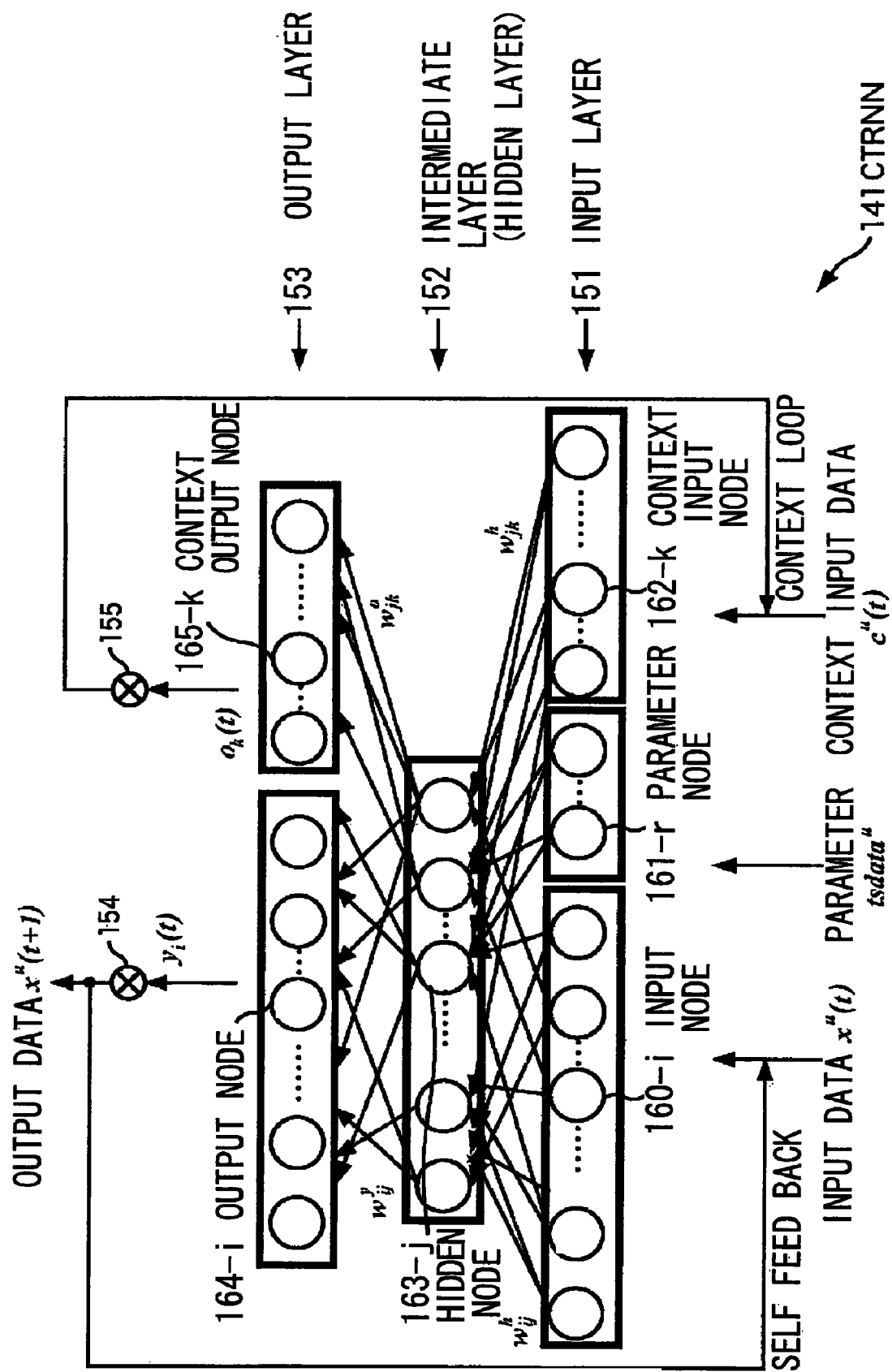
FIG. 5 shows a schematic view indicative of an example of the detailed configuration of RNNs to be used in an upper time series prediction generation unit.

FIG. 5 shows a schematic view indicative of an example of the detailed configuration of a CTRNN employed as the CTRNN 81.

FIG. 5 shows a CTRNN 141 that includes an input layer 151, an intermediate layer (hidden layer) 152, an output layer 153, and arithmetic sections 154, 155.

The input layer 151 has input nodes 160-i (i=1, ..., I), parameter nodes 161-r (r=1, ..., R), and context input nodes 162-k (k=1, ..., K), while the intermediate layer 152 has hidden nodes 163-j (j=1, ..., J). Furthermore, the output layer 153 has output nodes 164-i (i=1, ..., I) and context output nodes 165-k (k=1, ..., K).

In case the respective nodes of the input nodes 160-i, parameter nodes 161-r, context input nodes 162-k, hidden nodes 163-j, output nodes 164-i, and context output nodes 165-k do not have to be discriminated, these nodes are simply referred to as input node 160, parameter node 161, context input node 162, hidden node 163, output node 164, and context output node 165.

In the CTRNN 141, it is learned that, with respect to a state vector $x^u$ (t) at the time point "t" input thereto, a state vector $x^u$ (t+1) at the time point "t+1" is predicted to be output. The CTRNN 141 has a regression loop called a context loop indicative of the internal state of the network, and the temporal development rule of time series data being the subject can be learned when the processing based on the internal state is performed.

The state vector $x^u$ (t) at the time point "t" supplied to the CTRNN 141 is input to the input node 160. To the parameter node 161, a parameter $tsdata^u$ is input. The parameter $tsdata^u$ is data that identifies the kind (pattern of time series data) of the state vector $x^u$ (t) supplied to the CTRNN 141, which is data that identifies the action sequence in the CTRNN 81. Even if the parameter $tsdata^u$ is a fixed value, since it can be considered that the same value is input continuously, data (vector) which is input to the parameter node 161 at the time point "t" is set to parameter $tsdata^u$ (t).

To the input nodes 160-i, data $x^u_i$ (t) which are i-th components configuring the state vector $x^u$ (t) at the time point "t" are input. Furthermore, to the parameter nodes 161-r, data $tsdata^u_r$ (t) which are r-th components configuring the parameter $tsdata^u$ (t) at the time point "t" are input. Moreover, to the context input nodes 162-k, data $c^u_k$ (t) which are k-th components configuring an internal state vector $c^u$ (t) of the CTRNN 141 at the time point "t" are input.

In case the data $x^u_i$ (t), $tsdata^u_r$ (t), and $c^u_k$ (t) are input to the respective input nodes 160-i, parameter nodes 161-r, and context input nodes 162-k, the data $x_i$ (t), $tsdata_r$ (t), and $c_k$ (t) which are output from the input nodes 160-i, parameter nodes 161-r, and context input nodes 162-k are represented by the following mathematical formulas (3), (4), and (5).

$$x_i(t)=f(x_i^u(t)) \quad \text{[Mathematical Formula 3]}$$

$$tsdata_r(t)=f(tsdata_r^u(t)) \quad \text{[Mathematical Formula 4]}$$

$$c_k(t)=f(c_k^u(t)) \quad \text{[Mathematical Formula 5]}$$

The function "f" in the mathematical formulas (3) to (5) is a differentiable continuous function such as the sigmoid function, and the mathematical formulas (3) to (5) represent that the data $x^u_i$ (t), $tsdata^u_r$ (t), and $c^u_k$ (t) which are input to the respective input nodes 160-i, parameter nodes 161-r, and context input nodes 162-k are activated by the function "f", and output as the data $x_i$ (t), $tsdata_r$ (t), and $c_k$ (t) from the input nodes 160-i, parameter nodes 161-r, and context input nodes 162-k. The superscript "u" of the data $x^u_i$ (t), $tsdata^u_r$ (t), and $c^u_k$ (t) represents the internal state of nodes before being activated (which is similar with respect to other nodes).

Data $h^u_j$ (t) which is input to the hidden nodes 163-j can be represented by the following mathematical formula (6) using weighting coefficients $w^h_{ij}$ representing the weight of coupling between the input nodes 160-i and the hidden nodes 163-j, weighting coefficients $w^h_{jr}$ representing the weight of coupling between the parameter nodes 161-r and the hidden nodes 163-j, and weighting coefficients $w^h_{jk}$ representing the weight of coupling between the context input nodes 162-k and the hidden nodes 163-j, while data $h_j$ (t) which is output from the hidden nodes 163-j can be represented by the following mathematical formula (7).

$$h_j^u(t)=\Sigma w_{ij}^h x_i(t)+\Sigma w_{jr}^h tsdata_r(t)+\Sigma w_{jk}^h c_k(t) \quad \text{[Mathematical Formula 6]}$$

$$h_j(t)=f(h_j^u(t)) \quad \text{[Mathematical Formula 7]}$$

The "Σ" of the first term of the right-hand side in the mathematical formula (6) represents that the addition is performed with respect to the entire i=1 to I, and the "Σ" of the second term thereof represents that the addition is performed with respect to the entire r=1 to R, and the "Σ" of the third term thereof represents that the addition is performed with respect to the entire k=1 to K.

Similarly, data $y^u{}_i$ (t) which is input to the output nodes 164-i, data $y_i$ (t) which is output from the output nodes 164-i, data $o^u{}_k$ (t) which is input to the context output nodes 165-k, and data $o_k$ (t) which is output from the context output nodes 165-k can be represented by the following mathematical formulas.

$$y_i^u(t) = \Sigma w_{ij}^y h_j(t) \quad \text{[Mathematical Formula 8]}$$

$$y_i = f(y_i^u(t)) \quad \text{[Mathematical Formula 9]}$$

$$o_k^u(t) = \Sigma w_{jk}^o h_j(t) \quad \text{[Mathematical Formula 10]}$$

$$o_k(t) = f(o_k^u(t)) \quad \text{[Mathematical Formula 11]}$$

The $w^y{}_{ij}$ in the mathematical formula (8) are weighting coefficients representing the weight of coupling between the hidden nodes 163-j and the output nodes 164-i, and the "Σ" therein represents that the addition is performed with respect to the entire j=1 to J. Furthermore, the $w^o{}_{jk}$ in the mathematical formula (10) are weighting coefficients representing the weight of coupling between the hidden nodes 163-j and the context output nodes 165-k, and the "Σ" therein represents that the addition is performed with respect to the entire j=1 to J.

The arithmetic section 154 calculates the difference $\Delta x^u{}_i$ (t+1) between the data $x^u{}_i$ (t) at the time point "t" and the data $x^u{}_i$ (t+1) at the time point "t+1" from the data $y_i$ (t) which is output from the output nodes 164-i using the following mathematical formula (12), and further calculates the data $x^u{}_i$ (t+1) at the time point "t+1" using the following mathematical formula (13) to output thus calculated data.

[Mathematical formula 12]

$$\Delta x_i^u(t+1) = \frac{\left(-x_i^u(t) + \frac{y_i(t)}{\alpha}\right)}{\tau} \quad (12)$$

[Mathematical formula 13]

$$x_i^u(t+1) = \Delta x_i^u(x+1) + x_i^u(t) = \left(1 - \frac{1}{\tau}\right) x_i^u(t) + \frac{y_i(t)}{\alpha\tau} \quad (13)$$

In those mathematical formulas, the "α" and "τ" each represent an arbitrary coefficient.

Accordingly, when the data $x^u{}_i$ (t) at the time point "t" is input to the CTRNN 141, the data $x^u{}_i$ (t+1) at the time point "t+1" is output from the arithmetic section 154 of the CTRNN 141. The data $x^u{}_i$ (t+1) at the time point "t+1" output from the arithmetic section 154 is also supplied (fed back) to the input nodes 160-i.

The arithmetic section 155 calculates the difference $\Delta c^u{}_k$ (t+1) between the data $c^u{}_k$ (t) at the time point "t" and the data $c^u{}_k$ (t+1) at the time point "t+1" from the data $o_k$ (t) which is output from the context output nodes 165-k using the following mathematical formula (14), and further calculates the data $c^u{}_k$ (t+1) at the time point "t+1" using the following mathematical formula (15) to output thus calculated data.

[Mathematical formula 14]

$$\Delta c_k^u(t+1) = \frac{\left(-c_k^u(t) + \frac{o_k(t)}{\alpha}\right)}{\tau} \quad (14)$$

[Mathematical formula 15]

$$c_k^u(t+1) = \Delta c_k^u(t+1) + c_k^u(t) = \left(1 - \frac{1}{\tau}\right) c_k^u(t) + \frac{o_k(t)}{\alpha\tau} \quad (15)$$

The data $c^u{}_k$ (t+1) at the time point "t+1" output from the arithmetic section 155 is fed back to the context input nodes 162-k.

In the mathematical formula (15), the internal state vector $c^u$ (t+1) of the network at the next time point "t+1" is obtained by weighting and adding (adding with a predetermined ratio) the data $o_k$ (t) output from the context output nodes 165-k with the coefficient "α" to the internal state vector $c^u$ (t) indicative of the current internal state of the network. Accordingly, it can be said that the CTRNN 141 shown in FIG. 5 is the continuous time RNN.

As described above, in the CTRNN 141, when the data $x^u$ (t) and $c^u$ (t) at the time point "t" is input, since the processing of generating and outputting the $x^u$ (t+1) and $c^u$ (t+1) at the time point "t+1" is sequentially carried out, in case the weighting coefficients $w^h{}_{ij}$, $w^h{}_{ir}$, $w^h{}_{jk}$, $w^y{}_{ij}$, and $w^o{}_{jk}$ have been learned, by giving the initial value $x^u$ ($t_0$)=X0 of the input data $x^u$ (t) which is input to the input node 160, parameter $tsdata^u$ which is input to the parameter node 161, and the initial value $c^u$ ($t_0$)=C0 of the context input data $c^u$ (t) which is input to the context input node 162, time series data can be generated.

The CTRNN 141 shown in FIG. 5 is employed as the CTRNN 81 shown in FIG. 3, and the errorL N is given to the input node 160 of the CTRNN 141, and the task ID is given to the parameter node 161. Accordingly, the number of pieces I of the input node 160 shown in FIG. 5 accords with the number of pieces N of the RNN. 71 of the lower time series prediction generation unit 61. As the initial value $c^u$ ($t_0$)=C0 of the context input data $c^u$ (t) input to the context input node 162, for example, a predetermined random value is given.

Next, referring to a flowchart shown in FIG. 6, the learning processing of learning time series data of a sensor motor signal corresponding to an action sequence in the lower time series prediction generation unit 61 will be explained.

Firstly, in step S1, the control circuit 76 of the lower time series prediction generation unit 61 reads in input data at a predetermined time point supplied as teacher data. As described above, the input data is a sensor motor signal, and it is assumed that the sensor motor signal sm (t) at the time point "t" is read in. Thus read in sensor motor signal sm (t) at the time point "t" is supplied to the N pieces of RNNs 71-1 to 71-N configuring the lower time series prediction generation unit 61, respectively, by the control circuit 76.

In step S2, RNN 71-n (n=1, 2, ..., N) of the lower time series prediction generation unit 61 calculates the sensor motor signal $sm_n$ (t+1) at the time point "t+1" with respect to the sensor motor signal sm (t) at the time point "t".

Furthermore, in step S2, the arithmetic circuit 74 calculates the prediction error $errorL^{t+1}{}_n$ of the RNN 71-n. Specifically, as the prediction error $errorL^{t+1}{}_n$, the arithmetic circuit 74 calculates prediction errors corresponding to sensor motor signals for the past L time steps from the time point "t+1", which are represented by the following mathematical formula (16).

[Mathematical formula 16]

$$errorL_n^{t+1} = \frac{1}{2} \sum_{T=t+1-L}^{t+1} \sum_{i'=1}^{I'} (sm_{n,i'}^*(T) - sm_{n,i'}(T)) \quad (16)$$

In the mathematical formula (16), the $sm_{n,i'}(T)$ represents a sensor motor signal which is output by the i'-th node 113 of the I' pieces of nodes 113 (FIG. 4) in the output layer 103 of the RNN 71-n which outputs a sensor motor signal sm (T) at the time point "T", and the $sm_{n,i'}^*(T)$ represents a sensor motor signal as teacher data corresponding thereto.

According to the mathematical formula (16), the sum of errors between the sensor motor signal $sm_{n,i'}(T)$ of the i'-th node 113 in the output layer 103 of the RNN 71-n and the teacher data $sm_{n,i'}^*(T)$ from the time point T=t+1-L to the time point T=t+1 is set to the prediction error $errorL_n^{t+1}$ of the RNN 71-n at the time point "t+1". In case the past sensor motor signal does not exist for the L time steps, the prediction error $errorL^{t+1}$ can be obtained using only data for existing time steps.

In step S3, the arithmetic circuit 74 supplies the prediction error $errorL_{n}^{t+1}$ of the RNN 71-n at the time point "t+1" to the memory 75. Accordingly, the memory 75 is supplied with the "n" pieces of prediction errors $errorL_1^{t+1}$ to $errorL_N^{t+1}$ of the RNNs 71-1 to 71-N, and the memory 75 stores the prediction errors $errorL^{t+1} N = \{errorL_1^{t+1}, errorL_2^{t+1}, \ldots, errorL_N^{t+1}\}$. Furthermore, in case the judgment of processing in step S7 to be described later is No, since the processing of the step S3 is repeated by predetermined time steps, in the memory 75, the time series data errorL N of the prediction errors for the teacher data is stored.

In step S4, the control circuit 76 calculates learning weight $\upsilon_n$ of the RNN 71-n according to the prediction error $errorL_n^{t+1}$. Specifically, the control circuit 76 calculates the learning weight $\upsilon_n$ using the following mathematical formula (17) employing the softmax function.

[Mathematical formula 17]

$$\gamma_n = softmax(errorL_n^{t+1}) \quad (17)$$
$$= \frac{\exp(errorL_n^{t+1})}{\sum_{p=1}^{N} \exp(errorL_p^{t+1})}$$

In step S5, the control circuit 76 updates weighting coefficient $w_{ab,n}$ of the RNN 71-n by employing the BPTT (Back Propagation Through Time) method. The weighting coefficient $w_{ab,n}$ represents a weighting coefficient between the nodes 111 of the input layer 101 and the nodes 112 of the intermediate layer 102 of the RNN 71-n, or represents a weighting coefficient between the nodes 112 of the intermediate layer 102 and the nodes 113 of the output layer 103 of the RNN 71-n.

In updating the weighting coefficient $w_{ab,n}$ of the RNN 71-n, the weighting coefficient $w_{ab,n}$ of the RNN 71-n is calculated according to the learning weight $\upsilon_n$ calculated in step S4. Specifically, by employing the following mathematical formulas (18) and (19), from the s-time-th weighting coefficient $w_{ab,n}$ (S) by the repeated calculation employing the BPTT method, the (s+1)-time-th weighting coefficient $w_{ab,n}$ (s+1) can be obtained.

$$\Delta w_{ab,n}(s+1) = \eta_1 \gamma_n \delta w_{ab,n} + \alpha_1 \Delta w_{ab,n}(s) \quad \text{[Mathematical Formula 18]}$$

$$w_{ab,n}(s+1) = w_{ab,n}(s) + \Delta w_{ab,n}(s+1) \quad \text{[Mathematical Formula 19]}$$

In the mathematical formula (18), the $\eta_1$ represents a learning coefficient, and the $\alpha_1$ represents an inertia coefficient. In the mathematical formula (18), in case s=1, $\Delta w_{ab,n}$ (s) is set to "0".

In step S6, the control circuit 76 supplies the use frequencies $FREQ_1$ to $FREQ_N$ of the RNNs 71-1 to 71-N to the memory 75. The memory 75 stores thus supplied use frequencies $FREQ_1$ to $FREQ_N$ of the RNNs 71-1 to 71-N. In above-described step S5, in case the learning weight $\upsilon_n$ is larger, the weighting coefficient $w_{ab,n}$ of the RNN 71-n is updated, and it is considered that the RNN 71-n is utilized. Accordingly, for example, the control circuit 76 counts up the use frequency $FREQ_n$ of the RNN 71-n whose learning weight $\upsilon_n$ is equal to or larger than a predetermined value. These use frequencies $FREQ_1$ to $FREQ_N$ are used in additional learning to be described later with reference to FIG. 10.

In step S7, the control circuit 76 of the lower time series prediction generation unit 61 judges whether or not supplying input data is ended.

In step S7, in case it is determined that supplying input data is not ended, that is, in case input data at the next time point following after the input data supplied in step S1 is supplied, returning to step S1, the subsequent processing is repeated.

On the other hand, in step S7, in case it is determined that supplying input data is ended, the learning processing is ended.

Next, learning the time series data of the prediction errors by the CTRNN 81 of the upper time series prediction generation unit 62 will be explained.

In case of making a humanoid robot having built therein the information processing apparatus 51 learn a plurality of action sequences, it is necessary that the weighting coefficients $w^h_{ij}$, $w^h_{jr}$, and $w^h_{jk}$ between the respective nodes of the input layer 151 and intermediate layer 152 and the weighting coefficients $w^y_{ij}$ and $w^o_{jk}$ between the respective nodes of the intermediate layer 152 and output layer 153, which are obtained as the result of the learning, are values capable of corresponding to all the action sequences.

Accordingly, in the learning processing, learning time series data corresponding to the plural action sequences is executed simultaneously. That is, in the learning processing, the CTRNNs 141 (FIG. 5), the number of which is equal to the number of the action sequences to be learned, are prepared, and the weighting coefficients $w^h_{ij}$, $w^h_{jr}$, $w^h_{jk}$, $w^y_{ij}$, and $w^o_{jk}$ are obtained for the respective action sequences. Then, by repeatedly executing the processing of setting the average values of the weighting coefficients to single weighting coefficients $w^h_{ij}$, $w^h_{jr}$, $w^h_{jk}$, $w^y_{ij}$, and $w^o_{jk}$, weighting coefficients $w^h_{ij}$, $w^h_{jr}$, $w^h_{jk}$, $w^y_{ij}$, and $w^o_{jk}$ of the CTRNN 81 to be utilized in the generation processing can be obtained.

FIG. 7 shows a flowchart of the learning processing of the upper time series prediction generation unit 62 in learning time series data of Q pieces of prediction errors corresponding to Q pieces of action sequences. In this embodiment, since action sequences to be learned are A, B, and C, the number of the action sequences is three, that is, Q=3.

Firstly, in step S31, the upper time series prediction generation unit 62 reads in the time series data errorL N of the Q pieces of prediction errors as teacher data from the memory 75 of the lower time series prediction generation unit 61.

Then, the upper time series prediction generation unit 62 supplies thus read in Q pieces of time series data errorL N to the Q pieces of CTRNNs 141, respectively.

In step S32, the upper time series prediction generation unit 62 reads in task IDs for identifying the respective Q pieces of action sequences. In this embodiment, task IDs for identifying the three action sequences A, B, and C are read in. Then, the upper time series prediction generation unit 62 supplies a task ID for identifying the action sequence A to one of the CTRNNs 141 to which teacher data for the action sequence A is supplied, supplies a task ID for identifying the action sequence B to one of the CTRNNs 141 to which teacher data for the action sequence B is supplied, and supplies a task ID for identifying the action sequence C to one of the CTRNNs 141 to which teacher data for the action sequence C is supplied.

In step S33, the upper time series prediction generation unit 62 assigns "1" to the variable "s" representing the number of times of learning.

In step S34, in the CTRNNs 141 corresponding to the Q pieces of time series data, the upper time series prediction generation unit 62 calculates error amounts $\delta w^h_{ij}$, $\delta w^h_{jr}$, and $\delta w^h_{jk}$ of the weighting coefficients $w^h_{ij}$ (S), $w^h_{jr}$ (s), and $w^h_{jk}$ (s) between the respective nodes of the input layer 151 and intermediate layer 152, and error amounts $\delta w^y_{ij}$ and $\delta w^h_{jk}$ of the weighting coefficients $w^y_{ij}$ (s) and $w^o_{jk}$ (s) between the respective nodes of the intermediate layer 152 and output layer 153 by employing the BPTT method. In the CTRNNs 141 to which the q-th (q=1, ..., Q) time series data is input, the error amounts $\delta w^h_{ij}$, $\delta w^h_{jr}$, $\delta w^h_{jk}$, $\delta w^y_{ij}$, and $\delta w^o_{jk}$ which are obtained by employing the BPTT method are represented as error amounts $\delta w^h_{ij,\ q}$, $\delta w^h_{jr,\ q}$, $\delta w^h_{jk,\ q}$, $\delta w^y_{ij,\ q}$, and $\delta w^o_{jk,\ q}$.

In the calculation employing the BPTT method in step S34, when inversely propagating error amount $\delta c^u_k$ (t+1) of the data $c^u_k$ (t+1) of the context input nodes 162-k at the time point "t+1" to error amount $\delta o_k$ (t) of the data $o_k$ (t) of the context output nodes 165-k at the time point "t", the upper time series prediction generation unit 62 adjusts the time constant of the context data by carrying out the division processing with an arbitrary positive coefficient "m".

That is, the upper time series prediction generation unit 62 obtains the error amount $\delta o_k$ (t) of the data $o_k$ (t) of the context output nodes 165-k at the time point "t" employing the following mathematical formula (20) using the error amount $\delta c^u_k$ (t+1) of the data $c^u_k$ (t+1) of the context input nodes 162-k at the time point "t+1",

[Mathematical formula 20]

$$\delta o_k(t) = \frac{1}{m}\delta c^u_k(t+1) \quad (20)$$

Employing the mathematical formula (20) in the BPTT method, the degree of influence one time step ahead of the context data representing the internal state of the CTRNN 141 can be adjusted.

In step S35, the upper time series prediction generation unit 62 averages and updates the respective weighting coefficients $w^h_{ij}$, $w^h_{jr}$, and $w^h_{jk}$ between the respective nodes of the input layer 151 and intermediate layer 152 and the respective weighting coefficients $w^y_{ij}$ and $w^o_{jk}$ between the respective nodes of the intermediate layer 152 and output layer 153 using Q pieces of time series data.

That is, employing the following mathematical formulas (21) to (30), the upper time series prediction generation unit 62 obtains weighting coefficients $w^h_{ij}$ (S+1), $w^h_{jr}$ (S+1), and $w^h_{jk}$ (S+1) between the respective nodes of the input layer 151 and intermediate layer 152 and weighting coefficients $w^y_{ij}$ (S+1) and $w^o_{jk}$ (S+1) between the respective nodes of the intermediate layer 152 and output layer 153.

[Mathematical formula 21]

$$\Delta w^h_{ij}(s+1) = \eta_2 \frac{1}{Q}\sum_{q=1}^{Q} \delta w^h_{ij,q} + \alpha_2 \Delta w L^h_{ij}(s) \quad (21)$$

[Mathematical formula 22]

$$w^h_{ij}(s+1) = w^h_{ij}(s) + \Delta w^h_{ij}(s+1) \quad (22)$$

[Mathematical formula 23]

$$\Delta w^h_{jr}(s+1) = \eta_2 \frac{1}{Q}\sum_{q=1}^{Q} \delta w^h_{jr,q} + \alpha_2 \Delta w^h_{jr}(s) \quad (23)$$

[Mathematical formula 24]

$$w^h_{jr}(s+1) = w^h_{jr}(s) + \Delta w^h_{jr}(s+1) \quad (24)$$

[Mathematical formula 25]

$$\Delta w^h_{jk}(s+1) = \eta_2 \frac{1}{Q}\sum_{q=1}^{Q} \delta w^h_{jk,q} + \alpha_2 \Delta w^h_{jk}(s) \quad (25)$$

[Mathematical formula 26]

$$w^h_{jk}(s+1) = w^h_{jk}(s) + \Delta w^h_{jk}(s+1) \quad (26)$$

[Mathematical formula 27]

$$\Delta w^y_{ij}(s+1) = \eta_2 \frac{1}{Q}\sum_{q=1}^{Q} \delta w^y_{ij,q} + \alpha_2 \Delta w^y_{ij}(s) \quad (27)$$

[Mathematical formula 28]

$$w^y_{ij}(s+1) = w^y_{ij}(s) + \Delta w^y_{ij}(s+1) \quad (28)$$

[Mathematical formula 29]

$$\Delta w^o_{jk}(s+1) = \eta_2 \frac{1}{Q}\sum_{q=1}^{Q} \delta w_{jk,q}o + \alpha_2 \Delta w^o_{jk}(s) \quad (29)$$

[Mathematical formula 30]

$$w^o_{jk}(s+1) = w^o_{jk}(s) + \Delta w^o_{jk}(s+1) \quad (30)$$

In the mathematical formulas, the $\eta_2$ represents a learning coefficient, and $\alpha_2$ represents an inertia coefficient. In the mathematical formulas (21), (23), (25), (27), and (29), in case s=1, $\Delta w^h_{ij}$ (s), $\Delta w^h_{jr}$ (s), $\Delta w^h_{jk}$ (s) $\Delta w^y_{ij}$ (s), and $\Delta w^o_{jk}$ (s) are set to "0".

In the step S36, the upper time series prediction generation unit 62 judges whether or not the variable "s" is equal to or smaller than a predetermined number of times of learning. The predetermined number of times of learning set up here is the number of times of learning which can be recognized when the learning error is sufficiently small.

In step S36, in case it is determined that the variable "s" is equal to or smaller than the predetermined number of times of learning, that is, the learning has not been carried out by the number of times under which it is recognized that the learning error is sufficiently small, in step S37, the upper time series prediction generation unit 62 increments the variable "s" by "1", and the processing returns to step S34. Accordingly, the processing from step S34 to step S36 is repeated. On the other hand, in step S36, in case it is determined that the variable "s" is larger than the predetermined number of times of learning, the learning processing is ended.

In step S36, other than determining the ending of the learning processing depending on the number of times of learning, the ending of the learning processing may be determined depending on whether or not the learning error is within a predetermined reference value.

As described above, in the learning processing of the upper time series prediction generation unit 62, by obtaining the weighting coefficients $w^h_{ij}$, $w^h_{jr}$, $w^h_{jk}$, $w^y_{ij}$, and $w^o_{jk}$ for the respective action sequences, and repeatedly executing the processing of obtaining the average values thereof, the weighting coefficients $w^h_{ij}$, $w^h_{jr}$, $w^h_{jk}$, $w^y_{ij}$, and $w^o_{jk}$ of the CTRNN 81 to be utilized in the generation processing can be obtained.

In above-described learning processing, the processing of obtaining the average values of the weighting coefficients $w^h_{ij}$, $w^h_{jr}$, $w^h_{jk}$, $w^y_{ij}$, and $w^o_{jk}$ for the respective action sequences is executed every time. On the other hand, this processing may be carried out every predetermined number of times. For example, in case the predetermined number of times of learning that ends the learning processing is 10000 times, the processing of obtaining the average values of the weighting coefficients $w^h_{ij}$, $w^h_{jr}$, $w^h_{jk}$, $w^y_{ij}$, and $w^o_{jk}$ for the respective action sequences may be executed every 10 times of learning.

Figure 6:
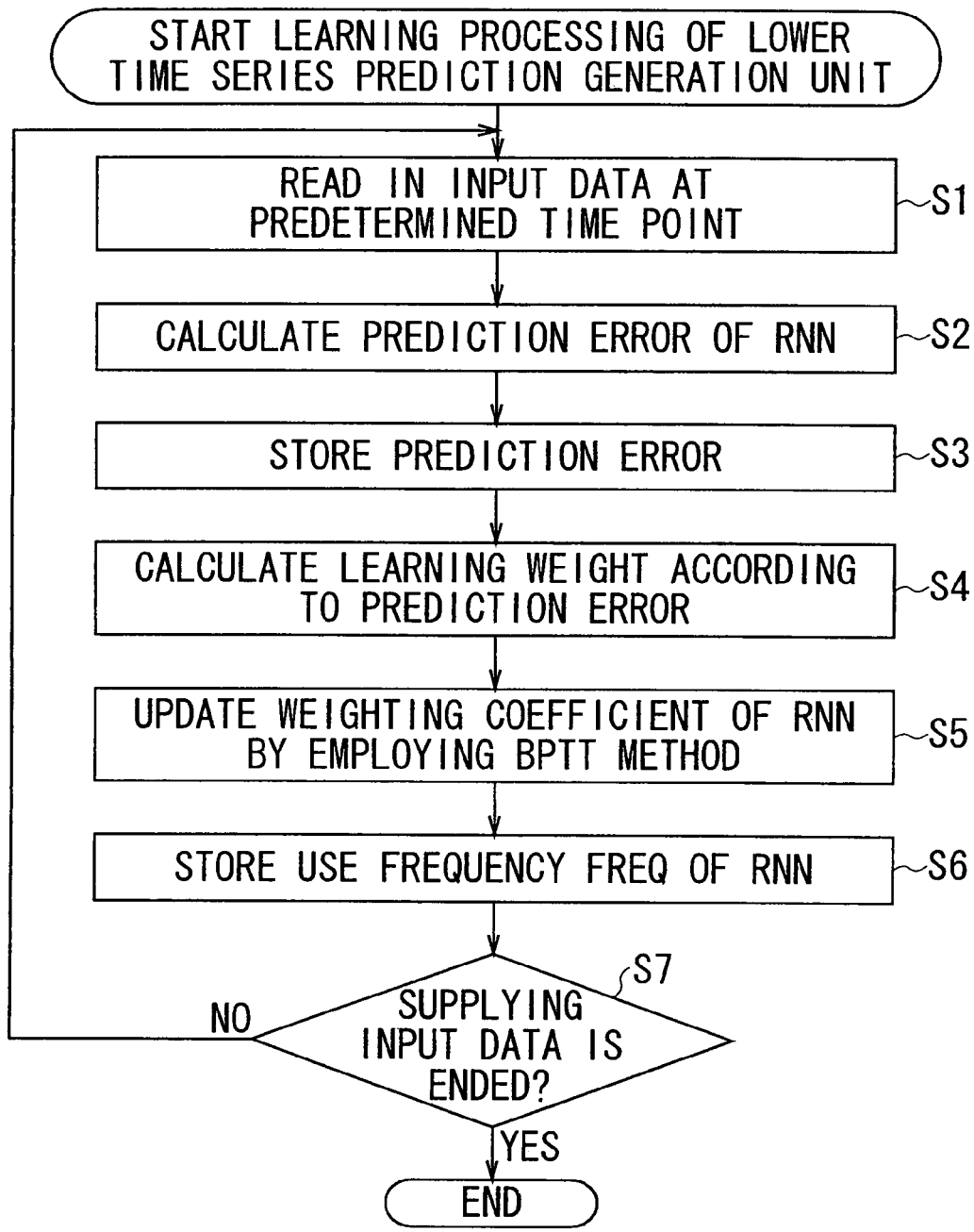
FIG. 6 shows a flowchart for explaining the learning processing of the lower time series prediction generation unit.

Next, referring to a flowchart shown in FIG. 8, generation processing of generating time series data by the information processing apparatus 51 shown in FIG. 3 including the RNNs 71-1 to 71-N and CTRNN 81 in which the weighting coefficients obtained in the learning processing explained with reference to FIG. 6 and FIG. 7 are set up will be explained.

Firstly, in step S51, the CTRNN 81 of the upper time series prediction generation unit 62 reads in the initial value of input data. The initial value of input data is the initial value to be supplied to the input node 160 and context input node 162 to which a predetermined random value is supplied.

In step S52, the CTRNN 81 of the upper time series prediction generation unit 62 reads in a task ID for identifying an action sequence. Thus read in task ID is supplied to the parameter node 161.

In step S53, the CTRNN 81 of the upper time series prediction generation unit 62 executes the processing of generating the estimation prediction errors errorPredH N of the RNNs 71-1 to 71-N at a predetermined time point. The details of the generation processing will be explained later with reference to FIG. 9, in which processing the CTRNN 81 may generate the estimation prediction errors errorPredH$^{t+1}$ N at the time point "t+1", and outputs thus generated estimation prediction errors to the gate signal conversion unit 63.

In step S54, the gate signal conversion unit 63 converts thus supplied estimation prediction errors errorPredH$^{t+1}$ N to the gate signals gate$^{t+1}$ N by employing the mathematical formula (2), and outputs thus converted gate signals to the gates 72-1 to 72-N.

In step S55, the sensor motor signal sm (t) at the time point "t" is input to the RNN 71-n of the lower time series prediction generation unit 61, and, with respect to the input sensor motor signal sm (t) at the time point "t", the RNN 71-n generates the sensor motor signal sm$_n$ (t+1) at the time point "t+1", and outputs thus generated sensor motor signal to the gate 72-n.

In step S56, the gate 72-n outputs the sensor motor signal sm$_n$ (t+1) corresponding to the gate signal g$^{t+1}_n$ of the gate signals gate$^{t+1}$ N supplied from the gate signal conversion unit 63. That is, in the gate 72-n, the gate is opened large in case the gate signal g$^{t+1}_n$ is large, while the gate is opened small in case the gate signal g$^{t+1}_n$ is small. To the composition circuit 73, the sensor motor signal sm$_n$ (t+1) according to the opened state of the gate of the gate 72-n is supplied.

In step S57, the composition circuit 73 composites outputs from the respective gates 72-1 to 72-N employing the mathematical formula (1), and outputs thus composited signal as the sensor motor signal sm (t+1) at the time point "t+1".

In step S58, the information processing apparatus 51 judges whether or not generating time series data will be ended. In step S58, in case it is determined that generating time series data will not be ended, the processing returns to the step S53, and the subsequent processing is repeated. As a result, in the upper time series prediction generation unit 62, estimation prediction errors errorPredH$^{t+2}$ N at the time point "t+2" following after the time point "t+1" processed in previous step S53 are generated, while in the lower time series prediction generation unit 61, a sensor motor signal sm (t+2) with respect to the sensor motor signal sm (t+1) at the time point "t+1" is generated.

On the other hand, in step S58, reaching a predetermined time step number, in case it is determined that generating time series data will be ended, the generation processing is ended.

Figure 9:
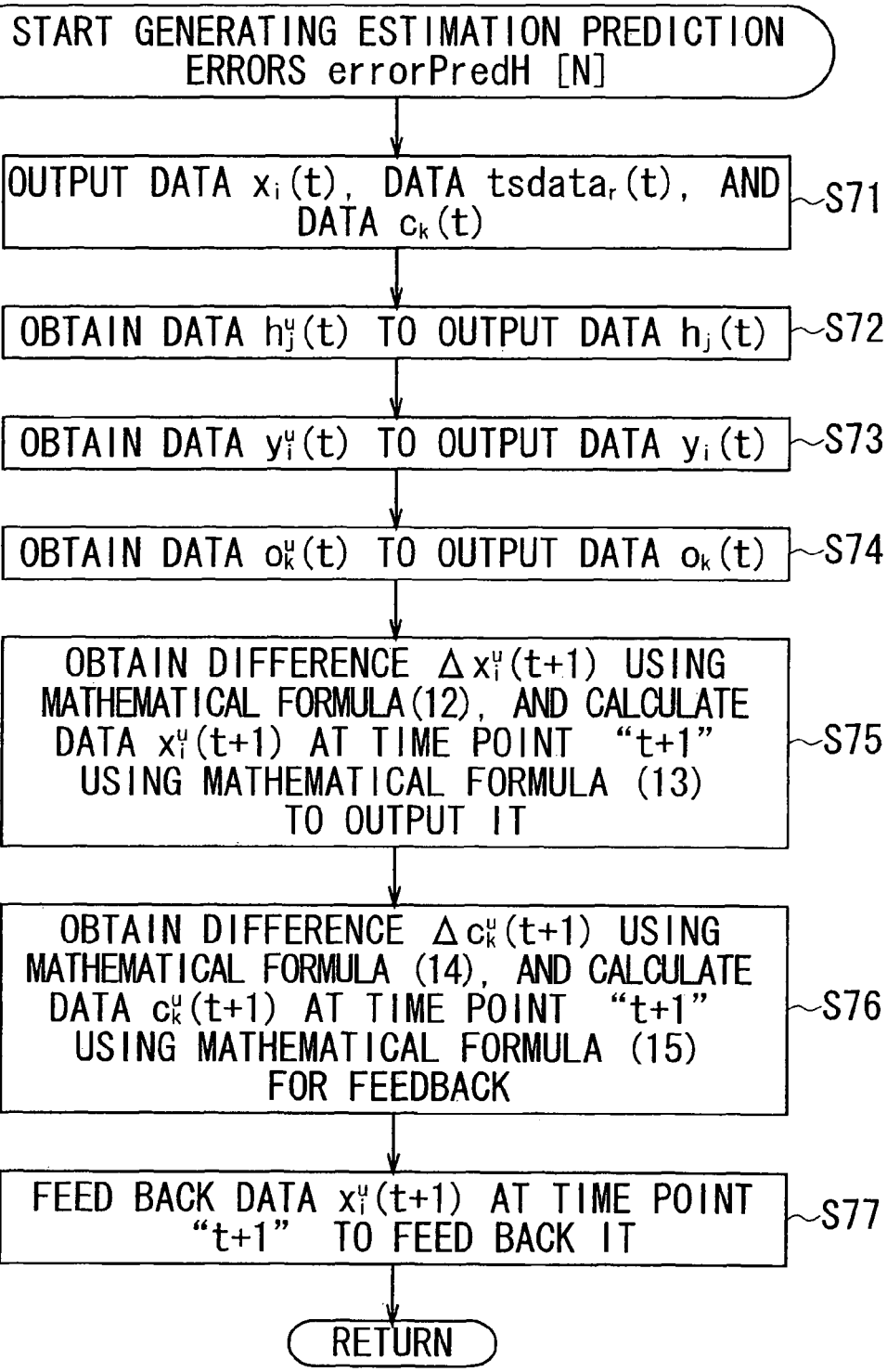
FIG. 9 shows a flowchart for explaining the generation processing in step S53 shown in FIG. 8.

Next, referring to a flowchart shown in FIG. 9, the processing of generating the estimation prediction errors errorPredH N in step S53 of FIG. 8 will be explained. In FIG. 9, an example of generating the estimation prediction errors errorPredH$^{t+1}$ N at the time point "t+1" will be explained.

Firstly, in step S71, the input nodes 160-i calculates the data $x_i$ (t) using the mathematical formula (3), and the parameter nodes 161-r calculates the data tsdata$_r$ (t) using the mathematical formula (4), and the context input nodes 162-k calculates the data $c_k$ (t) using the mathematical formula (5), outputting the data respectively.

In step S72, the hidden nodes 163-j obtain the data h$^u_j$ (t) by calculating the mathematical formula (6), and calculates and outputs the data h$_j$ (t) using the mathematical formula (7).

In step S73, the output nodes 164-i obtain the data y$^u_i$ (t) by calculating the mathematical formula (8), and calculates and outputs the data y$_i$ (t) using the mathematical formula (9).

In step S74, the context output nodes 165-k obtains the data o$^u_k$ (t) by calculating the mathematical formula (10), and calculates and outputs the data o$_k$ (t) using the mathematical formula (11).

In step S75, the arithmetic section 154 obtains the difference $\Delta x^u_i$ (t+1) using the mathematical formula (12), and calculates the data x$^u_i$ (t+1) at the time point "t+1" using the mathematical formula (13), and outputs thus calculated data to the gate signal conversion unit 63.

In step S76, the arithmetic section 155 obtains the difference $\Delta c^u_k$ (t+1) using the mathematical formula (14), and calculates the data c$^u_k$ (t+1) at the time point "t+1" using the mathematical formula (15). Furthermore, the arithmetic section 155 feeds back the data c$^u_k$ (t+1) at the time point "t+1" which is obtained after the calculation using the mathematical formula (15) to the context input nodes 162-k.

In step S77, the arithmetic section 154 feeds back the data x$^u_i$ (t+1) at the time point "t+1" which is obtained after the calculation using the mathematical formula (13) to the input nodes 160-i. Then, the processing returns to step S53 in FIG. 8, going to step S54.

As described above, in the generation processing in FIG. 8, the upper time series prediction generation unit 62 outputs the estimation prediction errors errorPredH N which are estimation values of prediction errors generated by the RNNs 71-1 to 71-N of the lower time series prediction generation unit 61 at the time of generation, and the estimation prediction errors errorPredH. N are converted to the gate signals gate N for controlling the opened/closed state of the gates 72-1 to 72-N. Then, the sum of the output signals $sm_1$ (t+1) to $sm_N$ (t+1) of the RNNs 71-1 to 71-N output from the gates 72-1 to 72-N which have their opened/closed state controlled, which is represented by above-described mathematical formula (1), is supplied to the sensor and motor arranged in the humanoid robot as the sensor motor signal sm (t+1) at the time point "t+1", and the action sequence specified by the task ID is executed.

Next, additional learning that makes the information processing apparatus 51 additionally learn action sequences other than the action sequences A, B, and C that have been learned up to then will be explained. Hereinafter, an action sequence D is additionally learned, under which the robot in the home position carries out the performance of seizing and holding up an object using its both hands up to a predetermined height, and placing the object on a front table that is higher than a table on which the object is originally placed by one stage, and returning to the home position.

As described above, in the RNNs 71-1 to 71-N of the lower time series prediction generation unit 61, action parts which are different from each other are learned. Furthermore, in general, the N pieces which represents the number of pieces of the RNN 71 is largely prepared as compared with the number of the action parts sufficiently. Accordingly, among the RNNs 71-1 to 71-N, there exist RNNs 71 (referred to as unused RNNs 71 arbitrarily, hereinafter) in which action parts are not learned.

In case of making the information processing apparatus 51 learn the new action sequence D in addition to the action sequences A, B, and C that have been learned up to then, the efficiency is improved when employing the manner of making RNNs 71 in which action parts have been learned intact, and making unused RNNs 71 learn new action parts included in the additional action sequence D. In this case, even if the additional action sequence D is learned, RNNs 71 which have performed the learning up to then are not broken down (weighting coefficients of RNNs 71 are not updated), and, in case action parts which have been learned up to then are included in the new action sequence D, the action parts can be utilized in common.

Accordingly, in additionally learning the action sequence D, to RNNs 71 in which action parts have been learned, the lower time series prediction generation unit 61 gives a resistance that makes it hard to change weighting coefficients.

The RNNs 71 in which action parts have been learned are RNN 71-n whose use frequency $FREQ_N$ stored in the memory 75 in step S6 in FIG. 6 is large.

Figure 10:
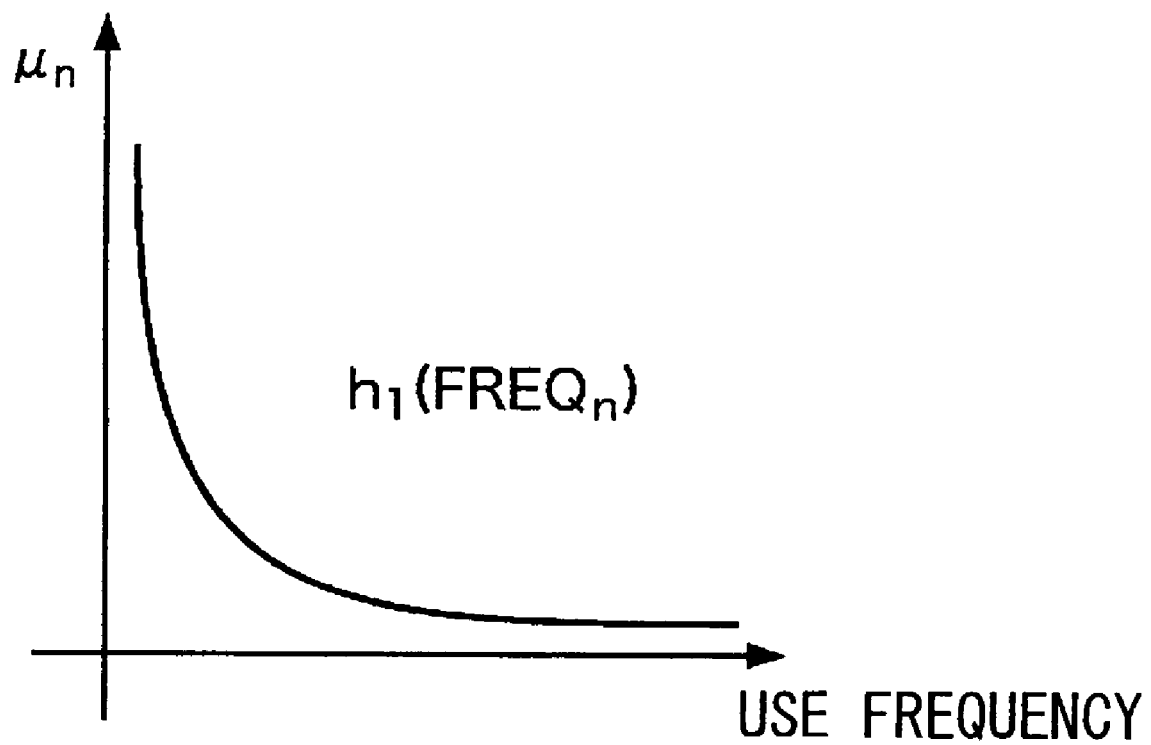
FIG. 10 shows a view for explaining a function $h_1$ that determines learning weight $\mu_n$ according to use frequency $FREQ_n$.

Accordingly, in the control circuit 76 of the lower time series prediction generation unit 61, as shown in FIG. 10, it is easy to update the weighting coefficient as for the RNN 71-n whose use frequency $FREQ_N$ is small, while it is difficult to update the weighting coefficient as for the RNN 71-n whose use frequency $FREQ_n$ is large. That is, the learning weight $\mu_n$ is determined depending on a function $h_1$ having the negative correlation in the use frequency $FREQ_n$. FIG. 10 shows a curve represented by the function $h_1$, which curve is large in inclination in case the use frequency $FREQ_n$ is small, while small in inclination in case the use frequency $FREQ_n$ is large. In FIG. 10, the function $h_1$ is represented as a nonlinear curve. On the other hand, a linear straight line may be employed so long as the function has the negative correlation.

Figure 11:
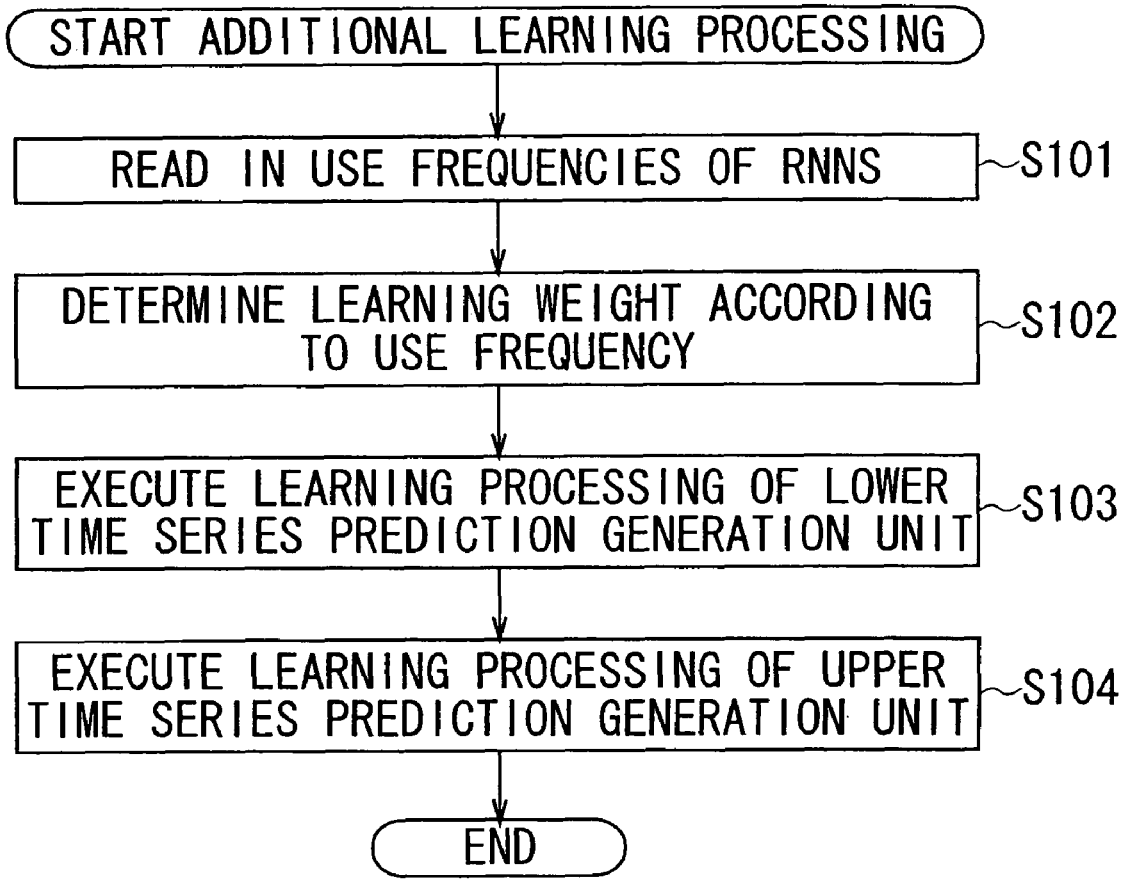
FIG. 11 shows a flowchart for explaining the additional learning processing of the information processing apparatus shown in FIG. 3.

Next, referring to a flowchart shown in FIG. 11, the additional learning processing of the information processing apparatus 51 will be explained.

Firstly, in step S101, the control circuit 76 of the lower time series prediction generation unit 61 reads in the use frequencies $FREQ_1$ to $FREQ_N$ of the RNNs 71-1 to 71-N stored in the memory 75.

In step S102, the control circuit 76 of the lower time series prediction generation unit 61 determines the learning weight in according to the use frequency $FREQ_n$ of the RNN 71-n using the function $h_1$ shown in FIG. 10. Thus determined learning weight $\mu_n$ is supplied to the RNN 71-n.

In step S103, the information processing apparatus 51 executes the learning processing of the lower time series prediction generation unit 61 shown in FIG. 6 of learning time series data of a sensor motor signal corresponding to the action sequence D, or processing of steps S1 to S7. In step S5 shown in FIG. 6 in the processing of step S103, instead of the mathematical formula (18), the following mathematical formula (31) including the learning weight $\mu_n$ is employed.

$$\Delta w_{ab,n}(s+1) = \eta_1 \mu_n \gamma_n \delta w_{ab,n} + \alpha_1 \Delta w_{ab,n}(s)$$ [Mathematical Formula 31]

After the processing of step S103, the time series data errorL N of the prediction errors of the action sequence D is stored in the memory 75.

In step S104, the information processing apparatus 51 reads in the time series data errorL N of the prediction errors of the action sequence D added to the action sequences A, B, and C from the memory 75, and, with respect to time series data of the four pieces of prediction errors, executes the learning processing of the upper time series prediction generation unit 62 shown in FIG. 7, or processing of steps S31 to S37. Then, the additional learning processing is ended.

As described above, in the additional learning processing of the information processing apparatus 51, with respect to the RNN 71-n whose use frequency $FREQ_n$ is large in the learning up to then, the learning weight $\mu_n$ making it difficult to change the weighting coefficient is given so as to learn the weighting coefficient. Accordingly, without changing the weighting coefficient of the RNN 71 which has been learned up to then by the learning of the additional action sequence D as much as possible, it becomes possible to learn the added action sequence effectively.

Next, another configuration of the information processing apparatus employing the present invention will be explained.

Figure 12:
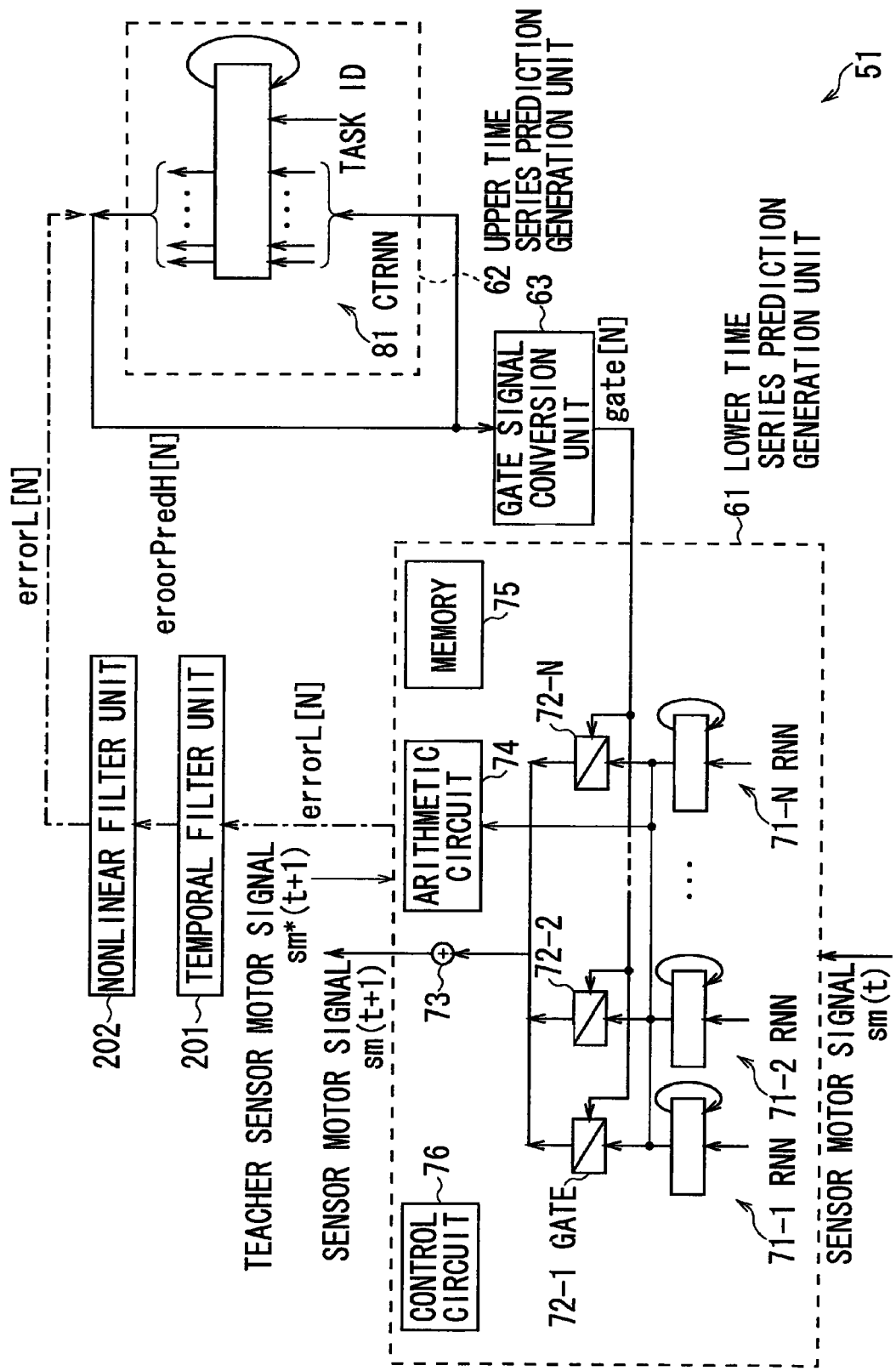
FIG. 12 shows a block diagram indicative of another example of the configuration of the information processing apparatus according to an embodiment of the present invention.

FIG. 12 shows a block diagram indicative of another example of the configuration of the information processing apparatus 51. In FIG. 12, parts or components similar to those of the information processing apparatus 51 shown in FIG. 3 are indicated with the same reference numerals, and detailed explanation of which will be omitted.

The configuration of the information processing apparatus 51 shown in FIG. 12 is similar to that of the information processing apparatus 51 shown in FIG. 3 except that a temporal filter unit 201 and a nonlinear filter unit 202 are newly provided.

To the temporal filter unit 201, the time series data errorL N of the prediction errors output from the lower time series prediction generation unit 61 is input. The temporal filter unit 201 and nonlinear filter unit 202 performs predetermined filter processing for time series data input thereto, and outputs the time series data after the processing to the subsequent stage. The nonlinear filter unit 202 supplies the time series data after the processing to the upper time series prediction generation unit 62 as time series data errorL' N of the prediction errors.

The upper time series prediction generation unit 62 learns the time series data of the prediction errors, and has to learn the rough variation of prediction errors of the RNNs 71-1 to 71-N in a long time step to some extent, and the minute variation in a short time period is not related thereto.

The temporal filter unit 201 performs the temporal filter processing for the time series data errorL N of the prediction errors output from the lower time series prediction generation unit 61. That is, the temporal filter unit 201 performs the lowpass filter processing for the time series data errorLN of the prediction errors output from the lower time series prediction generation unit 61, and supplies the time series data after the processing to the nonlinear filter unit 202. For example, as the lowpass filter processing, the moving average of a predetermined time step number may be used. Accordingly, the time series data of the prediction errors of the RNNs 71-1 to 71-N in which the minute variation in a short time period is suppressed can be supplied to the upper time series prediction generation unit 62.

The upper time series prediction generation unit 62 can be made to learn the rough variation of prediction errors of the RNNs 71-1 to 71-N in a long time step to some extent by making the sampling rate, under which the CTRNN 81 of the upper time series prediction generation unit 62 samples time series data, larger than the sampling rate of the RNN 71 of the lower time series prediction generation unit 61. For example, the upper time series prediction generation unit 62 can learn the rough variation of prediction errors of the RNNs 71-1 to 71-N by learning time series data which is obtained by thinning time series data of the RNN 71 of the lower time series prediction generation unit 61 every predetermined time interval. Furthermore, by adjusting the coefficient "τ" of the mathematical formulas (13) and (15), time sampling can be adjusted. In this case, in case the coefficient "τ" is larger, the rough variation of prediction errors of the RNNs 71-1 to 71-N can be learned.

Figure 13:
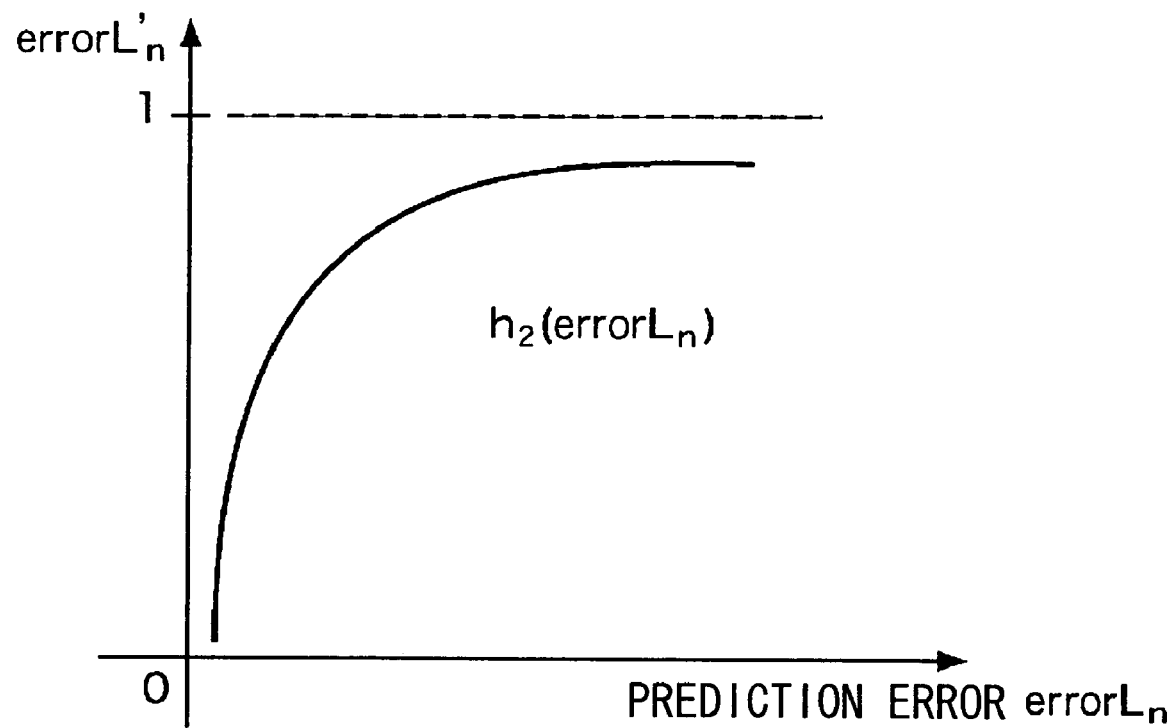
FIG. 13 shows a view for explaining a function $h_2$ that performs nonlinear conversion according to the size of prediction error $errorL_n$.

The nonlinear filter unit 202 converts input prediction error $errorL_n$ using a function $h_2$ that is represented by a nonlinear curve whose inclination is large in the range where input prediction error $errorL_n$ is small, and becomes smaller as the input prediction error $errorL_n$ becomes large, as shown in FIG. 13. The nonlinear filter unit 202 supplies prediction error errorL' N obtained after the conversion processing to the upper time series prediction generation unit 62.

In the generation processing by the information processing apparatus 51, as described above by referring to FIG. 8, the smaller the estimation prediction error $errorPredH_n$ of the RNN 71-n which is obtained by learning the prediction errors errorL N is, the larger the gate is opened. Conversely, the sensor motor signal $sm_n$ (t+1) which is output from the RNN 71-n whose estimation prediction error $errorPredH_n$ is large is scarcely used.

Accordingly, the smaller the estimation prediction error $errorPredH_n$ of the RNN 71-n is, the higher the contribution ratio to the sensor motor signal sm (t+1) output from the lower time series prediction generation unit 61 becomes, and it can be said that the RNN 71-n is important.

When considering the case in which prediction error $errorL_1$ of the RNN 71-1 and prediction error $errorL_n$ of the RNN 71-n are antagonistic to each other at a small value between "0" and "1" (for example, 0.3), and the case in which they are antagonistic to each other at a large value between "0" and "1" (for example, 0.9), in case the prediction error $errorL_1$ of the RNN 71-1 and the prediction error $errorL_n$ of the RNN 71-n are antagonistic to each other at a small value between "0" and "1", at the time of generation, the contribution ratio of the sensor motor signal $sm_1$ (t+1) or sensor motor signal $sm_n$ (t+1) output from the RNN 71-1 or RNN 71-n to the sensor motor signal sm (t+1) output from the lower time series prediction generation unit 61 is high, which of the sensor motor signals of the RNN 71-1 and RNN 71-n is superior comes to be important.

On the other hand, in case the prediction error $errorL_1$ of the RNN 71-1 and the prediction error $errorL_n$ of the RNN 71-n are antagonistic to each other at a large value between "0" and "1", it can be considered that, other than the RNN 71-1 and RNN 71-n, there exists an RNN 71 having a smaller prediction error, and at the time of generation, since the ratio that the sensor motor signal $sm_1$ (t+1) or sensor motor signal $sm_n$ (t+1) output from the RNN 71-1 or RNN 71-n is included in the sensor motor signal sm (t+1) output from the lower time series prediction generation unit 61 is small, which of the sensor motor signals of the RNN 71-1 and RNN 71-n is superior is not important.

Using the function $h_2$, the nonlinear filter unit 202 enlarges the superiority difference of the RNNs 71 whose prediction error errorL which is important in generating the sensor motor signal sm (t+1) is small, while lessens the superiority difference of the RNNs 71 whose prediction error errorL which is not important in generating the sensor motor signal sm (t+1) is large. Accordingly, in the upper time series prediction generation unit 62, the prediction error errorL which is important in the learning and output from the RNN 71 can be effectively learned.

The performance of the temporal filter unit 201 and nonlinear filter unit 202 is, in the case in which the upper time series prediction generation unit 62 reads in the time series data errorL N of the Q pieces of prediction errors as teacher data from the memory 75 of the lower time series prediction generation unit 61 in step S31 of the flowchart shown in FIG. 7, reading in the time series data errorL' N of the Q pieces of prediction errors after being processed by the temporal filter unit 201 and nonlinear filter unit 202.

The temporal filter unit 201 and nonlinear filter unit 202 do not have to be simultaneously arranged necessarily, and any one of them may be arranged.

In the information processing apparatus 51 shown in FIG. 3 and FIG. 12, as the configuration of the lower time series prediction generation unit 61 having the plural RNNs 71-1 to 71-N, the model of the Mixture of RNN Expert that integrates the plural RNN outputs using the gate mechanism to determine the final output is employed. On the other hand, configurations other than the Mixture of RNN Expert may be employed.

As configurations other than the Mixture of RNN Expert, for example, the RNN-SOM may be employed in which the self-organization map used in the category learning for vector patterns (referred to as SOM, hereinafter) is introduced, RNNs are used for respective nodes of the SOM, appropriate RNNs are selected for external inputs in the self-organization manner, and the parameter learning of the RNNs is carried out. Concerning the SOM, details are written in "T. Kohonen, "self-organization map", Springer • Verlag Tokyo".

In the model of the Mixture of RNN Expert shown in FIG. 3 and FIG. 12, all the RNNs calculate learning errors (prediction errors) with respect to new learning samples (or time series data), and the respective RNNs learn the learning samples according to the degree of the learning errors.

On the other hand, in the RNN-SOM, all the RNNs calculate learning errors (prediction errors) with respect to new learning samples (or time series data), and the RNN whose learning error is smallest is determined as the winner. After the winner of the RNNs is determined, the concept of distance space with RNNs other than the self RNN is introduced with respect to the respective RNNs, in which, irrespective of the learning errors of the respective RNNs, the RNN which is close to the winner of the RNNs learns the learning samples according to the degree of neighborhood with the winner.

Figure 14:
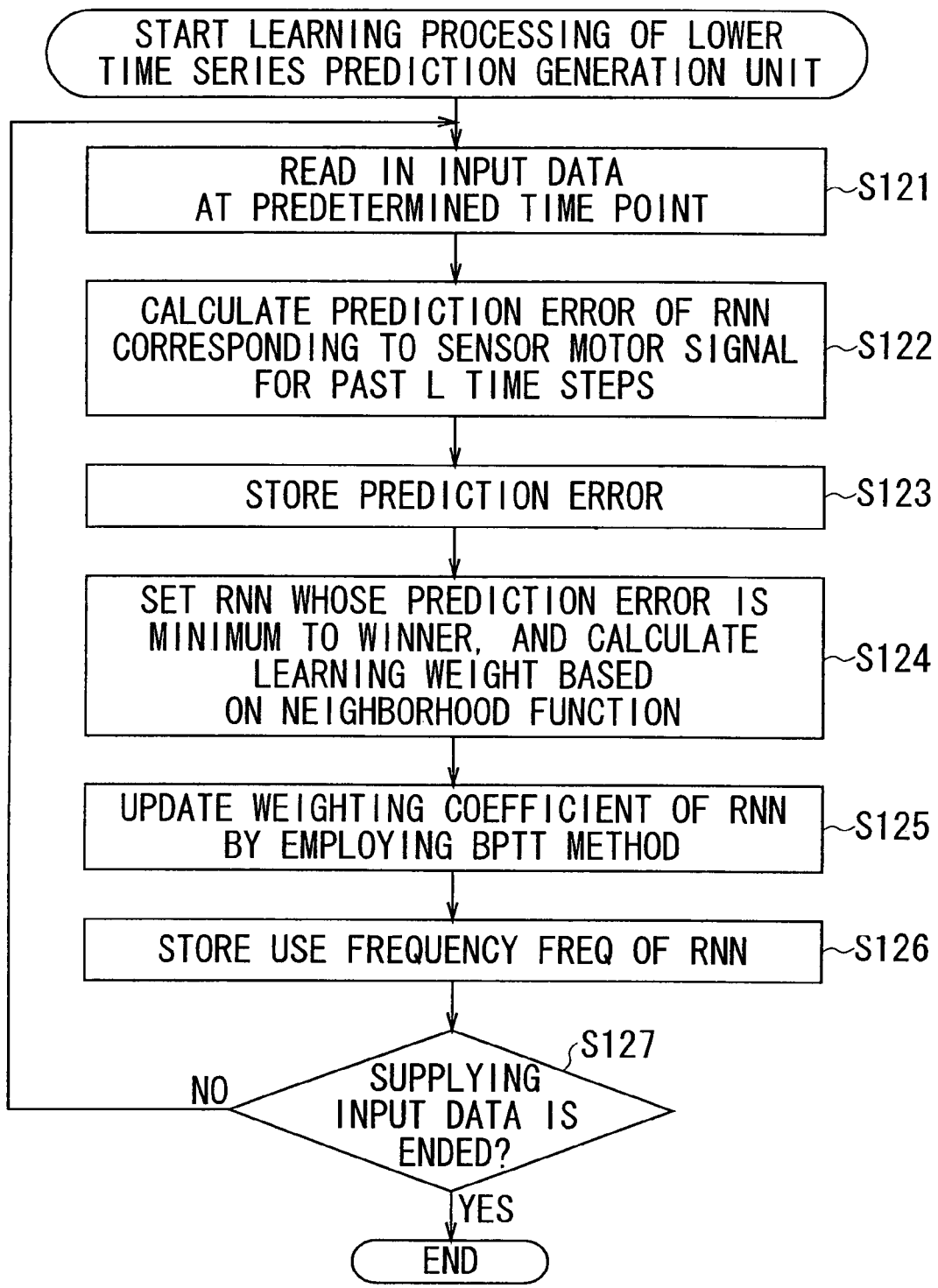
FIG. 14 shows a flowchart for explaining other learning processing of the lower time series prediction generation unit.

FIG. 14 shows a flowchart of the processing of learning time series data of a sensor motor signal corresponding to an action sequence in case the RNN-SOM is employed as the lower time series prediction generation unit 61.

The learning processing shown in FIG. 14 is similar to that shown in FIG. 6 except that the processing in step S124 shown in FIG. 14 is different from the processing in step S4 shown in FIG. 6.

That is, step S121 to step S123 and step, S125 to step S127 shown in FIG. 14 are equal to step S1 to step S3 and step. S5 to step S7 shown in FIG. 6, respectively.

Figure 15:
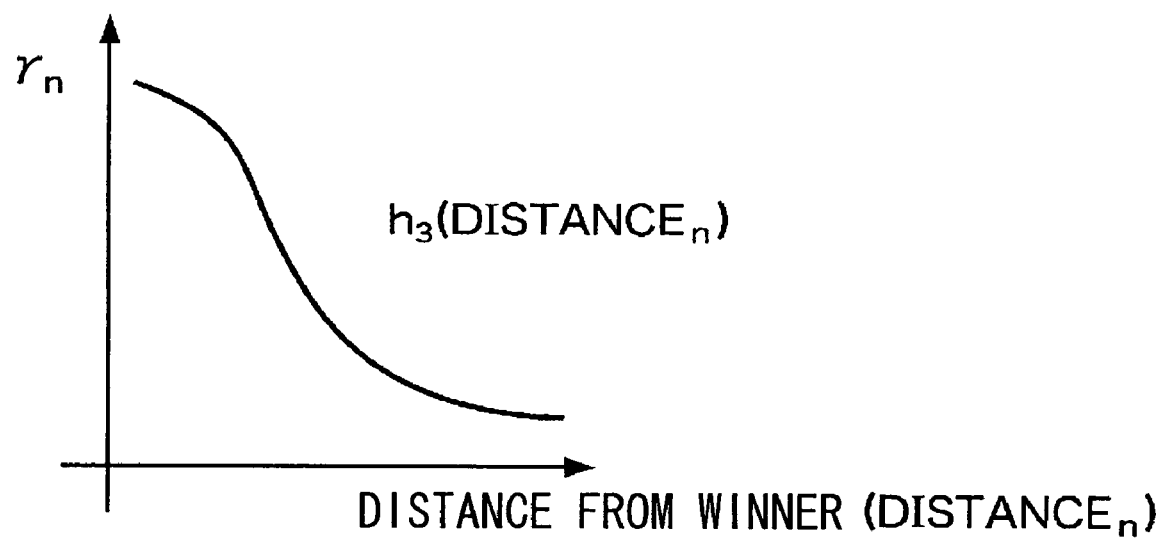
FIG. 15 shows a view for explaining a neighborhood function $h_3$ to be used in the learning processing shown in FIG. 14.

In step S124, the lower time series prediction generation unit 61 sets an RNN 71 whose prediction error errorL$_n^{t+1}$ is minimum to the winner, and, based on a neighborhood function $h_3$ shown in FIG. 15, calculates the learning weight $\upsilon_n$ according to the distance (DISTANCE$_n$) from the winner.

In the neighborhood function $h_3$, as shown in FIG. 15, to the RNN 71-n, the distance (DISTANCE$_n$) from which to the winner is close, the large learning weight $\upsilon_n$ is allocated.

Next, referring to FIG. 16 to FIG. 19, the result of an experiment of making the information processing apparatus 51 learn and generate action sequences to be carried out by a humanoid robot will be described.

In this experiment, the example of the information processing apparatus 51 shown in FIG. 12, in which the temporal filter and nonlinear filter processing is performed for the time series data errorL N of the prediction errors output from the lower time series prediction generation unit 61, is shown. The number of pieces N of the RNN 71 of the lower time series prediction generation unit 61 is set to 16 (N=16).

FIG. 16 shows the result that the information processing apparatus 51 generates the action sequence A after learning the action sequences A, B, and C.

FIG. 16A shows output data of the context output node 165 of the CTRNN 141 as the CTRNN 81 of the upper time series prediction generation unit 62 at the time of generation.

FIG. 16B shows the estimation prediction errors errorPredH N output from the CTRNN 81 of the upper time series prediction generation unit 62.

FIG. 16C shows the gate signals gate N which are obtained when the estimation prediction errors errorPredH N shown in FIG. 16B are converted by the gate signal conversion unit 63.

FIG. 16D shows motor signals of the sensor motor signal sm (t) output from the composition circuit 73 of the lower time series prediction generation unit 61, while FIG. 16E shows sensor signals of the sensor motor signal sm (t) output from the composition circuit 73 of the lower time series prediction generation unit 61, respectively. In FIG. 16D and FIG. 16E, data of four motor signals and two sensor signals are shown, and the numbers of the motor signals and sensor signals are set small as compared with the actual numbers so that the data is easily viewable.

The abscissa axis of the FIG. 16A to FIG. 16E represents the time step (step). The ordinate axis of the FIG. 16A, FIG. 16D, and FIG. 16E represents the output values of the context output node 165, motor signals, and sensor signals, which are values from "0" to "1". The ordinate axis of the FIG. 16B and FIG. 16C represents the RNN 71 number (1 to 16) of the lower time series prediction generation unit 61.

In FIG. 16B and FIG. 16C, the value of the estimation prediction error errorPredH$_n$ or gate signal $g^t_n$ for the RNN 71-n corresponds to the grey level. In FIG. 16B, when the value of the errorPredH$_n$ is small (that is, close to "0"), the grey level is blackly (thickly) represented, while in FIG. 16C, when the value of the gate signal $g^t_n$ is large (that is, close to "1"), the grey level is blackly (thickly) represented.

FIG. 17 shows the result that the information processing apparatus 51 generates the action sequence. B after learning the action sequences A, B, and C, while FIG. 18 shows the result of generating the action sequence C, respectively.

FIG. 19 shows the result that the information processing apparatus 51 generates the action sequence D after learning the action sequences A, B, and C, and then additionally learning the action sequence D.

FIG. 17 to FIG. 19 are similarly shown except that the shown data is related to the action sequences B to D.

In generating time series data corresponding to the action sequence A, as shown in FIG. 16C, in the anterior half of the sequence, the RNN 71-14 is effective since the gate 72-14 is opened, and then in the posterior half of the sequence, the RNN 71-4 is effective since the gate 72-4 is opened.

On the other hand, in the conversion from data shown in FIG. 16B to data shown in FIG. 16C, that is, in the conversion from the estimation prediction errors errorPredH N to the gate signals gate N, since the principle of the Winner-take-all in which the minimum one among the errorPredH$_1$ to errorPredH$_{16}$ is set to the sole winner is not employed but the softmax function of above-described mathematical formula (2) is employed, the effective RNN 71 is not discretely switched from the RNN 71-14 to the RNN 71-4 from a predetermined time point (time step) but the switching from the RNN 71-14 to the RNN 71-4 is slowly performed as the time lapses.

Accordingly, even in the case in which plural values among the errorPredH$_1$ to errorPredH$_{16}$ are antagonistic to each other, the winner is not alternated frequently, and the outputting is performed as the antagonistic state in the antagonistic state, which makes it possible to correctly generate the learned time series data.

In generating the action sequence B, as shown in FIG. 17C, the RNN 71-14, RNN 71-2, RNN 71-13, RNN 71-1, RNN 71-11 are effective, in this order.

Figures 18A, 18B, 18C, 18D, 18E:
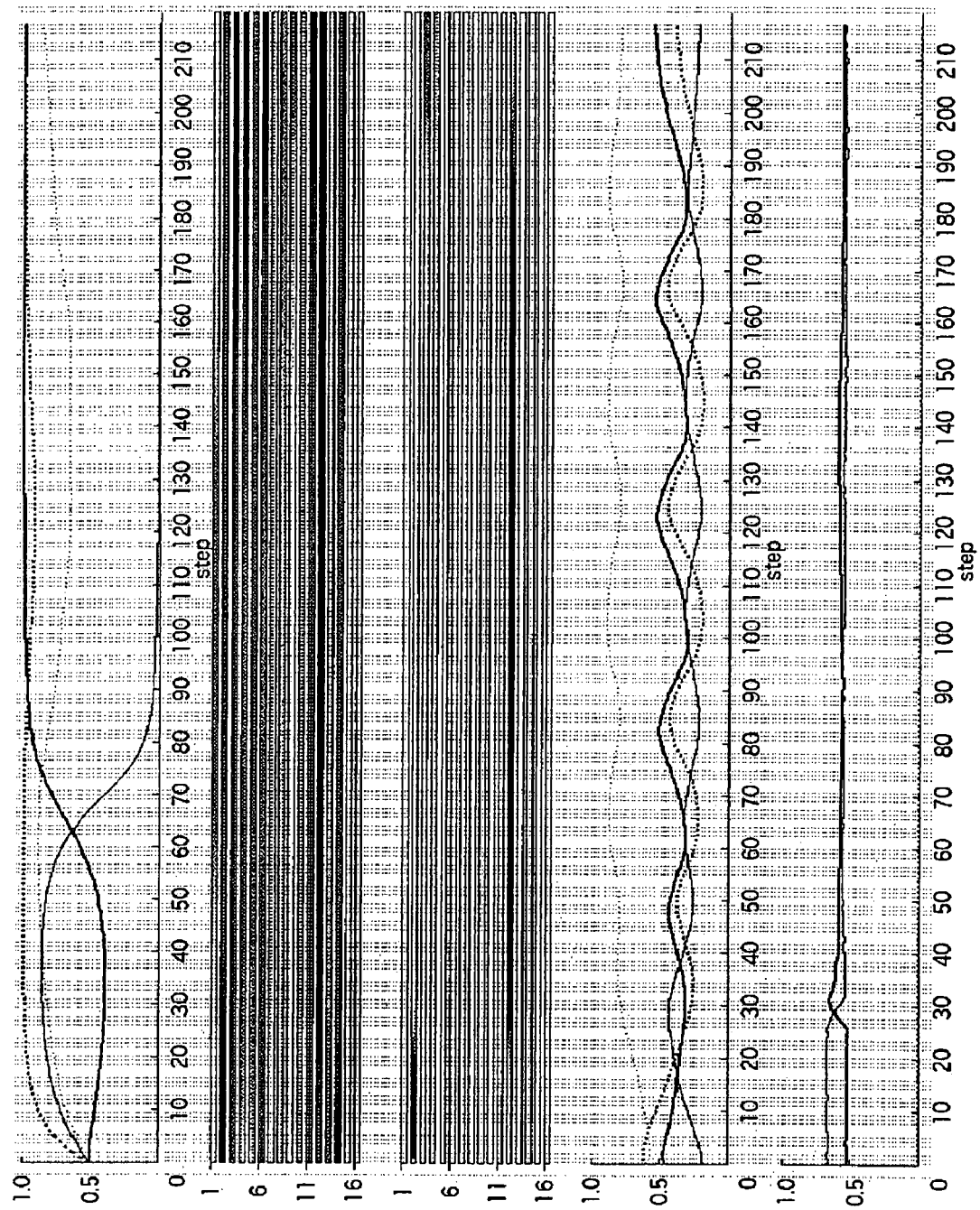
FIGS. 18A to 18E show experiment results of the information processing apparatus 51.

In generating the action sequence C, as shown in FIG. 18C, the RNN 71-2, RNN 71-12, RNN 71-3 are effective, in this order.

In generating the action sequence D, as shown in FIG. 19C, the RNN 71-5, RNN 71-15, RNN 71-3, RNN 71-16 are effective, in this order.

In switching the gate 72 of the action sequences B to D, the result similar to that in the case of the action sequence A shown in FIG. 16 can be obtained.

That is, in case the gate signals gate N are switched from the RNN 71-n whose estimation prediction error errorPredH$_n$ is largest at a predetermined time point to the RNN 71-n' (n≠n') whose estimation prediction error errorPredH$_{n'}$ is second largest in a predetermined time period, the gate signal $g_n$ gradually gets smaller, while the gate signal $g_{n'}$ gradually gets larger. That is, in the gate 72-n, the output of the sensor motor signal sm$_n$ (t+1) is gradually closed, while in the gate 72-n', the output of the sensor motor signal sm$_{n'}$ (t+1) is gradually opened.

Accordingly, even in the case in which plural values among the errorPredH$_1$ to errorPredH$_{16}$ are antagonistic to each other, the winner is not alternated frequently, and the outputting is performed as the antagonistic state in the antagonistic state, which makes it possible to correctly generate the learned time series data.

Furthermore, in the generation result of the action sequence D learned by the additional learning shown in FIG. 19, since the RNN 71-5, RNN 71-15, RNN 71-16, which are not effective in the action sequences A to C, are effective, it can be seen that a new RNN 71 learns action parts which are not in the action sequences A to C which have been learned up to then.

Above-described series of processing can be executed by a hardware or a software. In case of making a software execute this series of processing, programs configuring the software are installed into a computer that is built in a dedicated hardware, or a general-purpose personal computer that can execute various functions when various programs are installed thereinto, from a program recording medium.

Figure 20:
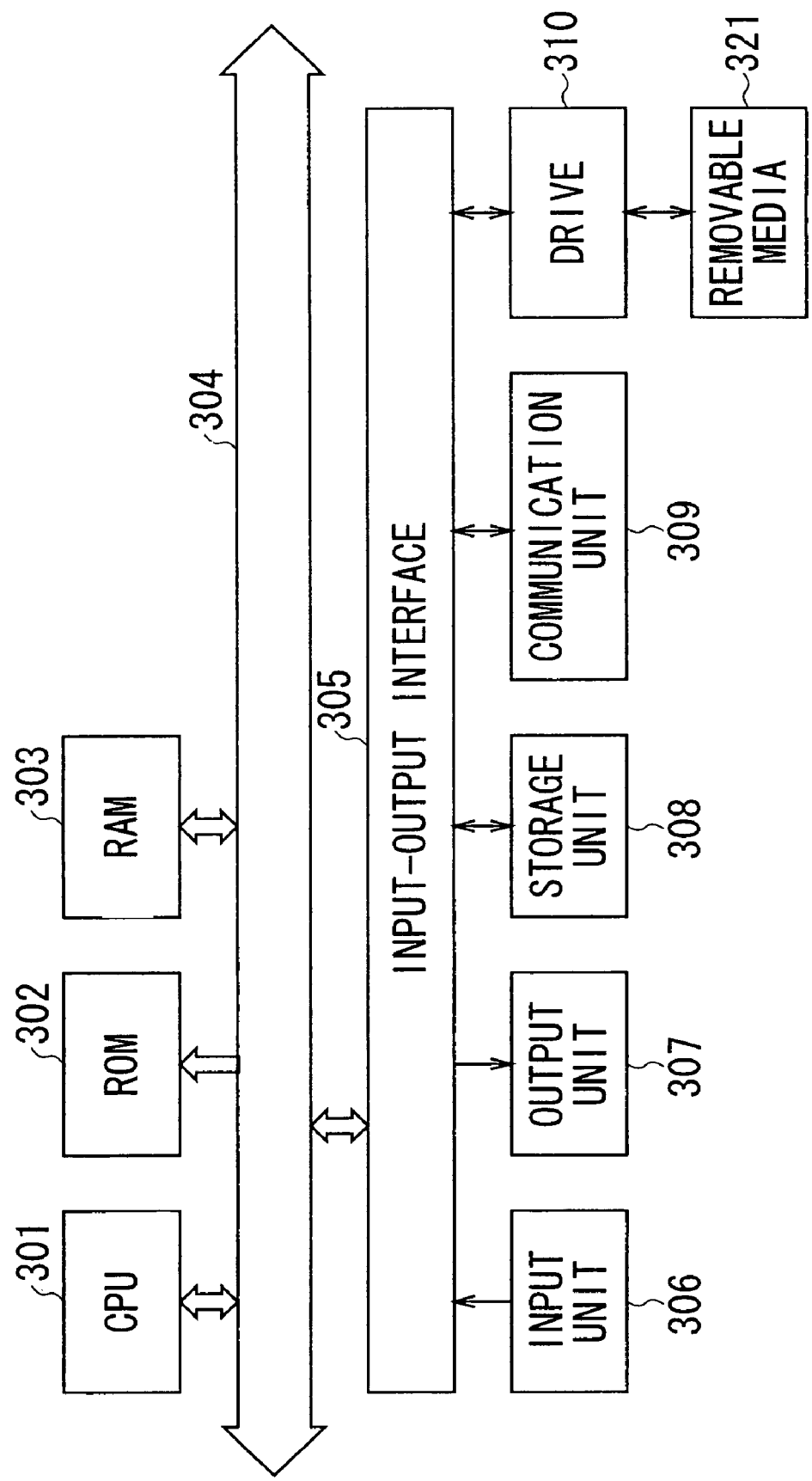
FIG. 20 shows a block diagram indicative of an example of the configuration of a computer according to an embodiment of the present invention.

FIG. 20 shows a block diagram indicative of an example of the configuration of a personal computer that executes above-described series of processing. A CPU (Central Processing Unit) 301 executes various processing in accordance with programs stored in a ROM (Read Only Memory) 302 or a storage unit 308. In a RAM (Random Access Memory) 303, programs to be executed by the CPU 301 or various data are arbitrarily stored. These CPU 301, ROM 302, and RAM 303 are mutually connected through a bus 304.

To the CPU 301, an input-output interface 305 is connected through the bus 304. To the input-output interface 305, an input unit 306 composed of a keyboard, a mouse, and a microphone, a display composed of a CRT (Cathode Ray Tube), an LCD (Liquid Crystal Display), etc., and an output unit 307 composed of loudspeakers are connected. The CPU 301 executes various processing according to commands input from the input unit 306. Then, the CPU 301 outputs the processing result to the output unit 307.

The storage unit 308 connected to the input-output interface 305 may be configured by a hard disk, and stores programs to be executed by the CPU 301 or various data. A communication unit 309 communicates with external devices through a network such as the Internet or a local area network, or communicates with external devices connected thereto directly.

A drive 310 connected to the input-output interface 305 drives a removable media 321 such as a magnetic disk, an optical disc, a magneto optical disc, or a semiconductor memory when the removable media 321 is loaded therein, and obtains programs or data recorded therein. Then, thus obtained programs or data are transferred to the storage unit 308, as circumstances demand, to be stored therein. Programs or data may be obtained through the communication unit 309 to be stored in the storage unit 308.

A program recording medium that is installed in a computer, and stores programs to be executed by the computer is configured by a magnetic disk (including a flexible disk), an optical disc (including a CD-ROM-(Compact Disc-Read Only Memory) and a DVD (Digital Versatile Disc)), a magneto optical disc, or the removable media 321 which is a package media configured by a semiconductor memory, or the ROM 302 in which programs are stored transiently or perpetually, or a hard disk configuring the storage unit 308, as shown in FIG. 20. Programs are stored in the program recording medium through the communication unit 309 being an interface such as a router, a modem, etc., as circumstances demand, utilizing a wired or wireless communication medium such as a local area network, the Internet, Digital Satellite Broadcasting.

In above-described example, the switching of the action sequences A to C at the time of generation is carried out by changing the task ID of the CTRNN 81. On the other hand, the switching of the action sequences A to C at the time of generation may be carried out by changing the initial value to be given to the context input node 162 without making the CTRNN 81 input the task ID.

In these embodiments, steps written in the flowcharts are those of a processing that is performed in the time-series manner along the written order, or a processing that is performed in parallel or individually not in the time-series manner necessarily.

The embodiments according to the present invention are not restricted to above-described embodiments, and various modifications are possible without departing from the scope and spirit of the present invention.

It should be understood by those skilled in the art that various modifications, combinations sub-combinations and alterations may occur depending on design requirements and other factors insofar as they are within the scope of the appended claims or the equivalents thereof.

What is claimed is:

1. An information processing apparatus, including:
   lower time series data generation means having a plurality of recurrent neural networks which learn predetermined time series data, and generate prediction time series data according to the learning result;
   upper time series data generation means having recurrent neural networks which learn error time series data that is time series data of errors raised at the time of the learning by the respective plural recurrent neural networks of the lower time series data generation means, and generate prediction error time series data that is time series data of prediction errors according to the learning result; and
   conversion means for performing nonlinear conversion for the prediction errors generated by the upper time series data generation means,
   wherein the lower time series data generation means outputs the prediction time series data generated by the respective plural recurrent neural networks according to the prediction errors which have undergone the nonlinear conversion by the conversion means,
   wherein the lower time series data generation means further comprises a plurality of gate means for opening and closing the outputs of the prediction time series data at the subsequent stages of the respective plural recurrent neural networks, and the plural gate means open and close the outputs of the prediction time series data according to the prediction errors which have undergone the nonlinear conversion by the conversion means,
   wherein the lower time series data generation means further comprises composition means for compositing and outputting the prediction time series data output from the plural gate means, and
   wherein a larger prediction error results a smaller opening of an associated gate means.

2. The information processing apparatus according to claim 1, wherein the recurrent neural networks of the upper time series data generation means are recurrent neural networks of the continuous time type.

3. The information processing apparatus according to claim 1, wherein the conversion means performs the nonlinear conversion for the prediction errors generated by the upper time series data generation means using the softmax function.

4. The information processing apparatus according to claim 1, further comprising temporal filter means for performing the temporal filter processing for the errors output by the lower time series data generation means.

5. The information processing apparatus according to claim 1, further comprising nonlinear filter means for nonlinearly converting the errors output by the lower time series data generation means.

6. The information processing apparatus according to claim 1, wherein, at the time of the learning, the lower time series data generation means updates the weight of learning of the respective plural recurrent neural networks according to errors raised at the time of the learning by the respective plural recurrent neural networks.

7. The information processing apparatus according to claim 1, wherein, at the time of the learning, of errors raised at the time of the learning by the respective plural recurrent neural networks, the lower time series data generation means sets a recurrent neural network that has raised a minimum error to the winner, and updates the weight of learning of the respective plural recurrent neural networks according to the distance from the winner.

8. An information processing method, comprising the steps of:

learning predetermined time series data, and generating prediction time series data according to the learning result;

learning error time series data that is time series data of errors raised at the time of learning the predetermined time series data; and generating prediction error time series data that is time series data of prediction errors according to the learning result;

performing nonlinear conversion for the generated prediction errors; and outputting the generated prediction time series data according to the prediction errors which have undergone the nonlinear conversion.

wherein the time series data generation step further comprises a plurality of gate steps for opening and closing the outputs of the prediction time series data at the subsequent stages, and the plural gate open and close the outputs of the prediction time series data according to the prediction errors which have undergone the nonlinear conversion by the conversion step, wherein the time series data generation step further comprises composition step for compositing and outputting the prediction time series data output from the plural gate steps, and wherein a large prediction error results a smaller opening of an associated gate step, 9. A non-transitory computer storage medium storing a program that makes a computer execute a processing, the processing comprising the steps of:

learning predetermined time series data, and generating prediction time series data according to the learning result;

learning error time series data that is time series data of errors raised at the time of learning the predetermined time series data, and generating prediction error time series data that is time series data of prediction errors according to the learning, and performing nonlinear conversion for the generated prediction errors, wherein the time series data generation step further comprises a plurality of gate steps for opening and closing the outputs of the prediction time series data at the subsequent stages, and the plural gate step open and close the outputs of the prediction time series data according to the prediction errors which have undergone the nonlinear conversion by the conversion step, wherein the time series data generation step further comprises composition step for compositing and outputting, the prediction time series data output from the plural gate steps, and wherein a larger prediction error results a smaller opening of an associated gate step.

* * * * *